(12) United States Patent
Pavao Moreira et al.

(10) Patent No.: US 10,644,872 B2
(45) Date of Patent: May 5, 2020

(54) COMMUNICATION UNIT, INTEGRATED CIRCUIT AND METHOD FOR CLOCK DISTRIBUTION AND SYNCHRONIZATION

(71) Applicant: NXP USA, Inc., Austin, TX (US)

(72) Inventors: Cristian Pavao Moreira, Frouzins (FR); Birama Goumballa, Larra (FR); Jean-Stephane Vigier, Mondonville (FR); Matthis Bouchayer, Toulouse (FR)

(73) Assignee: NXP USA, INC., Austin, TX (US)

( * ) Notice: Subject to any disclaimer, the term of this patent is extended or adjusted under 35 U.S.C. 154(b) by 0 days.

(21) Appl. No.: 16/447,979

(22) Filed: Jun. 21, 2019

(65) Prior Publication Data

US 2020/0007310 A1    Jan. 2, 2020

(30) Foreign Application Priority Data

Jul. 2, 2018   (EP) .................................... 18305861

(51) Int. Cl.
*H04L 7/06* (2006.01)
*H04L 7/00* (2006.01)
(52) U.S. Cl.
CPC ............ *H04L 7/065* (2013.01); *H04L 7/0087* (2013.01)
(58) Field of Classification Search
CPC ... H04L 7/0004; H04L 7/0008; H04L 7/0045; H04L 7/0054; H04L 7/0079; H04L 7/065; H04L 7/0091; H04L 7/10
See application file for complete search history.

(56) References Cited

U.S. PATENT DOCUMENTS

| | | | |
|---|---|---|---|
| 3,889,236 A | * | 6/1975 | Herger .................. H04L 7/0008 710/65 |
| 6,209,072 B1 | | 3/2001 | MacWilliams et al. |
| 6,775,328 B1 | | 8/2004 | Segaram |
| 6,963,219 B1 | | 11/2005 | Ghia et al. |
| 7,443,201 B2 | | 10/2008 | Koo |
| 7,646,220 B2 | | 1/2010 | Wu |
| 7,876,261 B1 | | 1/2011 | Adams |
| 8,121,200 B2 | | 2/2012 | Zheng |

(Continued)

OTHER PUBLICATIONS

Maxim, "10-Bit Bus LVDS Deserializers", Jan. 1, 2010, retrieved from the internet at https://datasheets.maximintegrated.com/en/ds/MAX9206-MAX9208.pdf on Jun. 18, 2019.

(Continued)

*Primary Examiner* — Siu M Lee
(74) *Attorney, Agent, or Firm* — Rajeev Madnawat

(57) ABSTRACT

A communication unit (400, 500) is described that includes a plurality of cascaded devices that comprise at least one master device and at least one slave device configured in a master-slave arrangement and configured to process at least one of: transmit signals, and receive signals. The at least one of at least one master device and at least one slave device comprises a demodulator circuit (564, 565) configured to: receive a modulated embedded master-slave clock signal (584) that comprises a system clock signal (582) with an embedded frame start signal (580); demodulate the modulated embedded master-slave clock signal (584); and re-create therefrom the system clock signal (588, 585) and the frame start signal (590, 586).

15 Claims, 11 Drawing Sheets

(56) References Cited

U.S. PATENT DOCUMENTS

| | | |
|---|---|---|
| 8,654,166 B2 | 2/2014 | Kamatani |
| 9,031,180 B2 | 5/2015 | Rahul et al. |
| 9,698,735 B1 | 7/2017 | McCue et al. |
| 2004/0196926 A1* | 10/2004 | Chien .................... H04L 7/042 375/316 |
| 2005/0018762 A1 | 1/2005 | Aiello et al. |
| 2011/0311008 A1 | 12/2011 | Slezak et al. |
| 2018/0024233 A1 | 1/2018 | Searcy et al. |

OTHER PUBLICATIONS

EP Patent Appln. No. 18305860.1, 48 pgs., (Jul. 2, 2018).
EP Patent Appln. No. 18305858.5, 38 pgs., (Jul. 2, 2018).
EP Patent Appln. No. 18305857.7, 39 pgs., (Jul. 2, 2018).
EP Patent Appln. No. 18305856.9, 26 pgs., (Jul. 2, 2018).

\* cited by examiner

COMMUNICATION UNIT, INTEGRATED CIRCUIT AND METHOD FOR CLOCK DISTRIBUTION AND SYNCHRONIZATION

CROSS-REFERENCE TO RELATED APPLICATIONS

This application claims the priority under 35 U.S.C. § 119 of European Patent Application No. 18305861.9, filed on Jul. 2, 2018, the contents of which are incorporated by reference herein.

FIELD OF THE INVENTION

The field of the invention relates to a communication unit, such as a radar unit, that includes a distributed master-slave arrangement and methods for clock distribution and synchronization. The invention is applicable to, but not limited to, a radar unit for, say, an automotive application, and method therefor.

Background of the Invention

There has been an increased demand for active safety systems for vehicles. Active safety systems require multiple radar sensors per vehicle, each radar sensor typically working with a specific radar technology. In an automotive application, the radar sensors are mostly built using a number of integrated circuits (ICs), sometimes referred to as 'chips'. The current trend is towards offering a radar system on chip (SoC), using a radio frequency (RF) complementary metal-oxide-semiconductor (CMOS) process technology) solution in order to reduce cost and power consumption.

Frequency-modulated continuous wave (FMCW) radar sensors transmit frequency modulated signals, and radar receivers substantially simultaneously receive their echo. The received echo is then mixed with the transmitted signal and results in a low frequency signal having a frequency of:

$$Fb = \frac{2 \times \text{Range}}{c} \times \frac{\text{Modulation } BW}{\text{Ramp duration}} \quad [1]$$

at the output of the mixer, the so-called beat frequency (Fb). By analysing the beat frequency, the range parameter (i.e. a distance to targets) can be extracted.

Commercial automotive radar sensors typically include multiple receivers and transmitters (the combination of which is referred to as transceivers (TRx)). A microcontroller (MCU) performs digital control of the transceiver circuits and digital signal processing of the digitized data (e.g. fast fourier transform (FFT) and digital signal processing) in order to output processed radar data to the MCU of the vehicle.

Next generation high performance radar solutions used for highly automated or fully autonomous driving will need to comply with stringent radar angular resolution requirements in both azimuth and elevation. Angular resolution is directly related to the radar system number of receiver antennas and their location with respect to each other. Current monolithic radar transceiver ICs are typically constrained to contain only a few transceiver channels, as the complexity and cost and heat dissipation problems of integrating more transceiver channels on the same chip increases substantially with the number of ICs that are included.

To allow increased angular resolution in both azimuth and elevation, a multi-chip set solution with a master device and several slaves may be used, as illustrated in FIG. 1. In this illustration, a known radar unit cascades two radar TRx chips. One of the radar TRx chips is defined as the master device 110, which contains a first set of transmitter circuits coupled to transmit antennas 112 and a first set of receiver circuits coupled to receive antennas 114. The master device 110 (or IC) provides a number of signals 130 to one or more slave device(s) 120. In this way, master and several slaves are cascaded coherently to increase the number of transmit and receive channels, thereby enabling an increase in sensor accuracy to improve angle resolution.

Each master device 110 and slave device 120 embeds several receiver and transmitter channels, and a microcontroller unit (MCU) is used to combine all received data from all receivers, as well as to control and program the master device 110 and slaves devices 120. The master device 110 is arranged to distribute the Local Oscillator (LO) signal 140 off-chip through transmission lines on the printed circuit board (PCB) 100 to other radar chips (in this case the one other TRx chip functioning as a slave device 120). The LO signal 140 is used for the different transmitters and receivers, and is typically star-routed (i.e. routed via equal length paths) to each device to guarantee the same delay and exact phase coherence between all devices (which are sometimes separate ICs). The slave device 120 (and further slave device(s) 123) contains a second set of transmitter circuits coupled to transmit antennas 122 and a second set of receiver circuits coupled to receive antennas 124.

The distribution of the LO signal 140 from the master device 110 ensures that the slave device 120 is also able to use the LO signal 140, and thereby ensure that the transmitting signal frequency and the clock frequency of the down mixer of different radar TRx are the same. The LO signal 140 is used by all devices (including the master device 110 wherein the LO signal 140 is routed out of the master device 110 and thereafter back into the master device 110. Typically, in master-slave arrangements, the LO signal 140 is routed with symmetrical PCB lengths in order to ensure that all receivers (encompassing a respective down mixer) in each master device 110 and slave device(s) 120, 123 of the system receive the same LO with same phase. Phase coherence is mandatory for cascaded systems. Other control signals may be synchronized with a lower speed clock, for example an analog-to-digital converter (ADC) clock, which may be used across multiple ICs/devices.

The master device 110 is coupled to the MCU 160, which includes various interfaces, such as a serial-parallel interface (SPI) 162, a general purpose data input-output port 170, a ramp frame start (RFS) circuit 168, as well as a MCU clock interface 164, this clock signal 165 generally provided by the master device 110.

The RFS signal can be either (i) generated and distributed by the MCU 160, through a dedicated pin on both the MCU 160 (RFS_out) and a single pin on master device(s) 110 and slave device(s) 120, 123 (RFS_in) or (ii) generated and distributed by the master device 110, where there is no pin needed for MCU 160 in this case.

In the first known architecture (i), as illustrated in FIG. 1 and which is the predominant architecture used in most current master-slave arrangements, RFS circuit 168 generates a RFS signal 166 that is used to trigger a starting point of modulation timing engines within each master device and slave device. The RFS signal 166 is generated by the MCU 160 and requires at least one dedicated MCU pin. The RFS can also be generated by the master device 110, through a SPI command from MCU 160 via RFS signal 140. In this case, generally two pins are needed in the master device 110 (to support RFSout, RFSin) and one pin in each slave device (RFSin) in order to allow a star distribution that is preferred to ensure a good symmetry of RFS signal. However, even using star connected PCB routing in the first architecture (i), perfect time alignment of frame start inside master device(s) 110 and slave devices 120, 123 is not possible because the MCU 160 and master device(s) 110 and slave devices 120, 123 are not synchronized, e.g. they are subject to different pad delays, no control on timing generation of RFS from MCU time engine, etc.

In the second known architecture (ii), when the RFS is generated from the master device 110: the signal to start the generation of RFS comes from a SPI command from the MCU 160. Thus, no RFS at the MCU side is needed in this case. The RFS is then generated by the master device 110. The connection from master device 110 to slave devices 120, 123 for routing that RFS signal can be performed in two different ways:

(a) a not star connected manner using a single pin on each master device 110 and slave device(s) 120, 123, so no alignment is possible; and (b) in a star connected manner whereby two pins (RFS_out and RFS_in) are used in the master device 110, and a single pin (RFS_in) used in each in slave device(s) 120, 123. This star routing ensures the symmetry of the RFS signal length in all chips, and thereby achieves a good alignment of chirp start signal (frame start). However, the inventors have recognised that this alignment is not sufficient to ensure the ADC clocks (i.e. the M/S clocks on each master device 110 and slave device(s) 120, 123) and RFS signal are synchronized between each other.

A master-slave (MS) clock signal 142 is generated by the master device and used as a time base for synchronization of the microcontroller time based events any other master device and all slave devices 123. The connection to the MCU 160 consists of SPI control lines 163 and digital data line signals from all the ICs back to the MCU 160 for later signal processing, in a given data format (e.g. Mobile Industry Processor Interface Camera Serial Interface (MIPI CSI-2), low voltage differential signalling (LVDS) or other formats).

The cascading master-slave (MS) clock signals (MS_clkP, MS_clkN) 142 are specifically used for time based synchronization of the sampling moments on the ADCs of several master and slave devices.

For optimal operation of distributed radar systems, it is important that these signals (LO 140, MS clock signal 142 and RFS signal 166) are synchronous across all receiver circuits on different devices. This means that, after calibration of the phase difference between all receiver channels in all master and slave devices, the voltage supply Vcc, temperature and aging variation between all devices distributed in the PCB should not change the initial clock alignment, for example after a one-time calibration operation is performed at radar module level.

A primary problem with such cascaded systems is clock distribution and synchronization. Problems arise due to any misalignment between clock valid and frame start timings between master device and slave device(s), due to different printed circuit board (PCB) delays between components, devices, circuits. This problem is typically overcome by adopting a MS clock distribution process in a star-connection architecture, in order to guarantee the same transmission line lengths and therefore a good clock alignment between the components, devices, circuits. The star-connection architecture is also required for the LO signal to achieve phase coherence when all the TRx channels are used as one antenna array. The requirement to adopt a star-connection architecture for all common signals (LO signal, MS clock, etc.) imposes severe constraints on the PCB design. A common and synchronised phase reference is particularly important in a distributed radar phased array design, in order to steer a beam and control a radiation pattern for the phased array system.

Synchronised clock signals are also used to sample data inside the ADCs of each device. In an FMCW radar device, the synchronized clock edges are used to sample data and control signals that are used to start the modulation. Here, the RFS signal across all devices must be synchronized. This alignment is needed to avoid sampling valid data at different times/moments in the master and slave devices, which would create phase errors between devices and consequently compromise radar system performance.

Even when adopting a star-connection architecture, a problem occurs when the RFS signal edge is dose to a MS dock edge. Particularly in response to processing, voltage or temperature (PVT) variations, a master device and one or more slave device(s) may observe RFS re-timed at a different dock edges. This means that for an intermediate frequency (IF) of, say, IF=20 MHz, an error of a complete 240 MHz MS clock cycle can happen. This leads to a phase error of around +/−15 degrees, which compromises radar angular resolution. Modern imaging radar systems specifications allow a maximum of +/−3 degrees of phase error, and this considers errors due to combined ADC sampling and receiver channel variations, as well as some PCB asymmetries. This translates to a stringent required synchronization time accuracy of around 416 psec., for a maximum intermediate frequency (IF) of 20 MHz.

LVDS is a technical standard that specifies electrical characteristics of a differential, serial communications protocol. LVDS operates at low power with programmable output amplitude of voltages and can run at very high speeds using inexpensive twisted-pair copper cables. FIG. 2 illustrates a known, classical LVDS communication link 200, that includes an LVDS transmitter 205 The LVDS transmitter 205 (or driver) provides a constant output current (e.g. 3.5 mA) generally terminated by a 100 ohm accurate external differential load termination 215. The LVDS transmitted signal 220 is a differential signal that is received by the LVDS receiver 210 and converted in general to a single ended CMOS output 225 that is used as a clock within circuits inside the LVDS receiver 210.

FIG. 3 illustrates a conventional LVDS receiver circuit 300. The conventional LVDS receiver circuit 300 employs a comparator with hysteresis, this circuit provides a CMOS output 315 when a LVDS signal 305 is at input.

U.S. Pat. No. 6,775,328 B1 proposes a feedback synchronization loop using mV input-output drivers and receivers, U.S. Pat. No. 9,031,180 B2 provides synchronization via a protocol (data frame) in wireless transmitters, U.S. Pat. No. 7,876,261 B1 proposes synchronization between devices using reflected wave clock synchronization. U.S. Pat. No. 6,209,072 B1 uses a de-skewing latch technique in order to obtain a synchronous interface between master device and slave devices. Each of these known techniques is complex and/or require further components and circuits, thereby requiring valuable PCB space and increased cost.

Thus, a mechanism is needed to better support synchronization between shared clocks signals (that use a master-slave clock (MS_CLK)) and a ramp frame start (RFS) signal in radar units that use multiple radar devices or ICs.

SUMMARY OF THE INVENTION

The present invention provides a communication unit, such as a radar unit, an integrated circuit and methods for clock distribution and synchronization in a master-slave arrangement, as described in the accompanying claims. Specific embodiments of the invention are set forth in the dependent claims. These and other aspects of the invention will be apparent from and elucidated with reference to the embodiments described hereinafter.

BRIEF DESCRIPTION OF THE DRAWINGS

Further details, aspects and embodiments of the invention will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION

Figure 1:
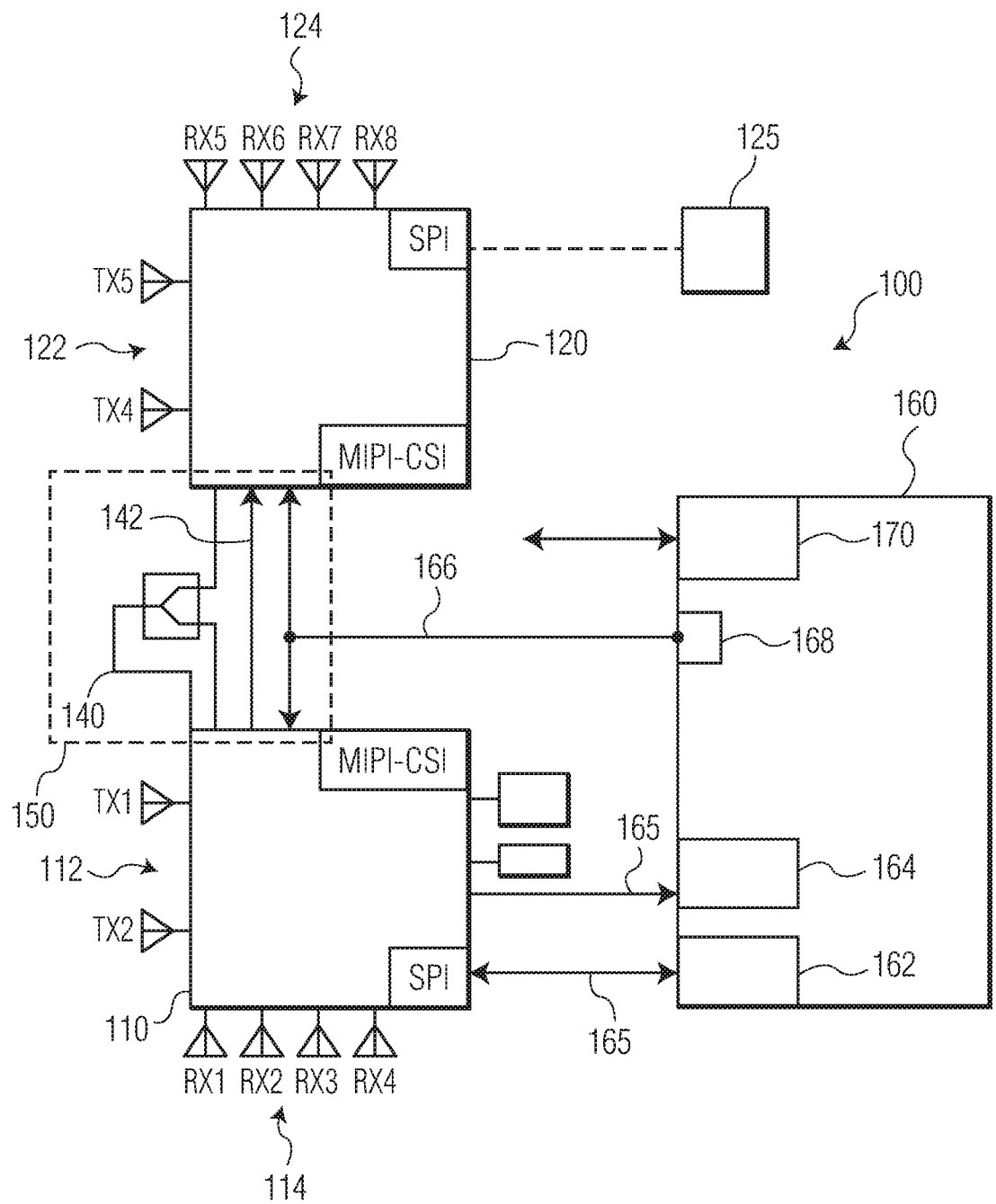
FIG. 1 illustrates a block diagram of a known radar unit that cascades two radar TRx chips.
Figure 2:
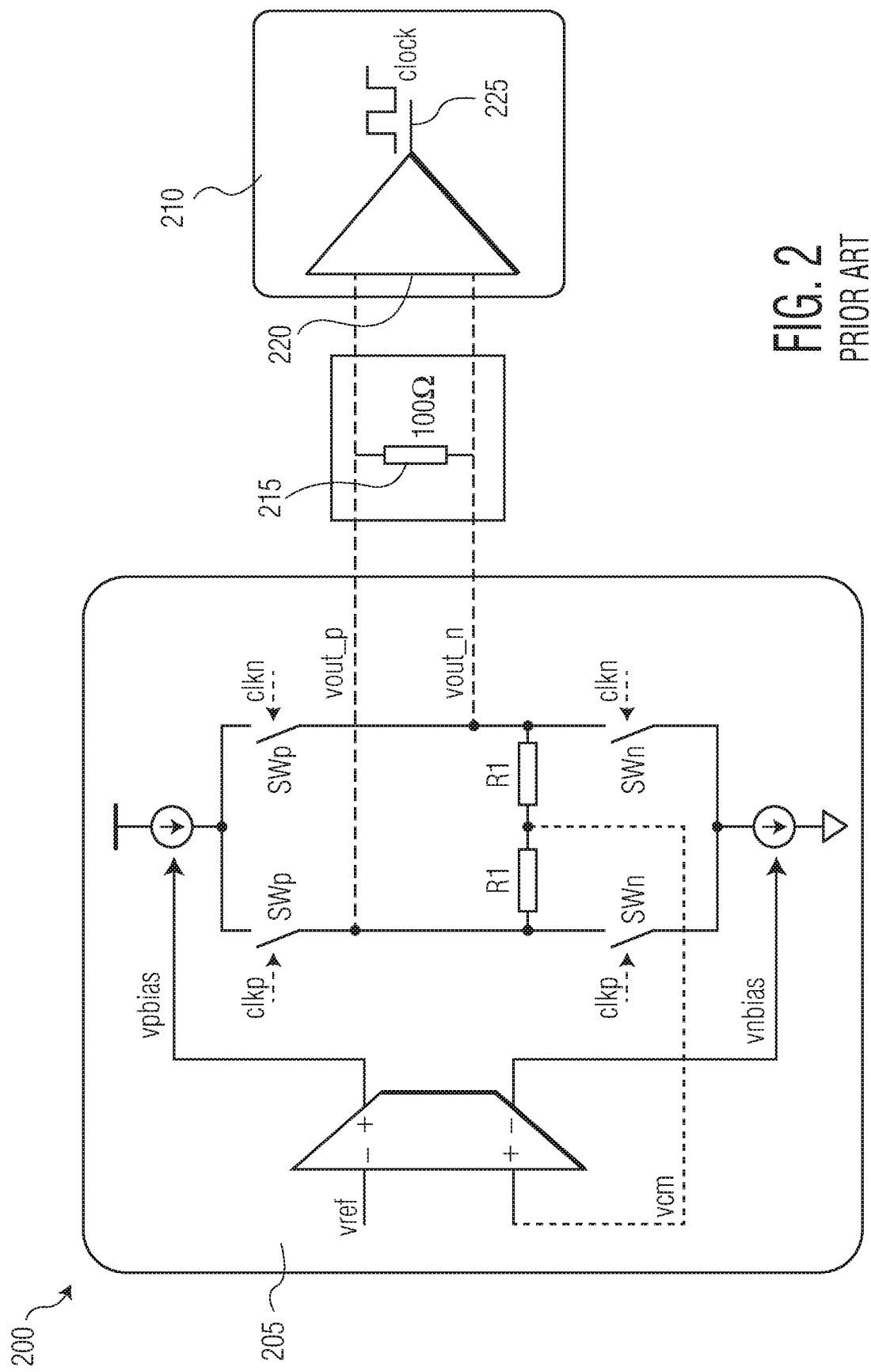
FIG. 2 illustrates a classical LVDS communication link.

Because the illustrated embodiments of the present invention may, for the most part, be implemented using electronic components and circuits known to those skilled in the art, details will not be explained in any greater extent than that considered necessary as illustrated below, for the understanding and appreciation of the underlying concepts of the present invention and in order not to obfuscate or distract from the teachings of the present invention.

To address the aforementioned synchronization problem between multiple devices or ICs within a communication unit, such as a radar unit, examples of the present invention propose a design to embed a frame start signal, such as a chirp start signal (RFS) of a radar unit, within the dock signal. Thereafter, the embedded signal may be shared between the master device(s) and slave device(s) (or ICs) in order to maintain synchronization that is significantly less reliant on PCB construction. Advantageously, the technique to embed a chirp start signal within the distributed master-slave clock signal (sometimes referred to as an ADC dock) enables the slave device(s) (and any other master device(s)) to readily and easily demodulate the distributed master-slave clock signal in order to obtain concurrently the chirp start (RFS). Thus, the master-slave clock distribution and the timing alignment between the master-slave clock signal and the RFS across all devices is inherently synchronized.

Such a technique benefits from the fact that the master-slave clock signal is quasi-perfectly synchronized (when using a star routed PCB) and delays of clock edges between different devices during voltage or temperature variations (once offset is calibrated) are minimal, e.g. less than one clock cycle error. Thus, in some examples, embodiments of the invention enable a designer to implement a digital cascading radar solution with increased phase aligned performance, where a single reference oscillator (e.g. phase locked loop (PLL)) may be used for all master and slave devices (supplying a reference frequency/clock and a main PLL frequency clock), thereby facilitating phase coherence, clock alignment and clock and RFS synchronization throughout the communication units.

Some examples of the invention enable the RFS signal (ramp frame start or chirp start) to be generated in the master device for synchronicity purposes, and not in the MCU as adopted in known communication units. This approach advantageously removes a need for a dedicated pin in the MCU and removes an additional routing constraint of this signal in the PCB, because the RFS signal is embedded within the distributed MS dock. In this example, the embedding of the RFS signal into the master-slave clock signal (thereby facilitating a distribution of the two signals with effectively no delay between the clock edges of each within the devices), may be achieved using a RFS modulator and a RFS demodulator, implemented in the master-slave clock distribution transmit and receive circuits, respectively.

Some examples of the invention may employ low-voltage differential signalling (LVDS), also known as TIA/EIA-644, in order to assist the modulation and demodulation of the embedded dock signal and chirp signal (i.e. low-to-high or high-to-low transitions) to provide synchronicity across different master device(s) and slave devices. In some examples, LVDS may be employed in order to reduce interference or signal pollution between supplies, due to current spikes, if CMOS logic were used. Some examples of the invention may take advantage of the fact that LVDS amplitude levels ($V_{diff}$) can be programmed, for example by programming a LVDS transmitter current value ($V_{diff}=2*Idc\_x*R_{load}$), assuming a constant 100 ohms termination load ($R_{load}$), placed in each LVDS receiver. Some alternative examples may employ CMOS differential technology to demodulate/de-embed the RFS signal from a distributed differential master-slave clock signal. Some yet further alternative examples may employ CMOS single-ended technology to demodulate/de-embed the RFS signal from a distributed multiple (logic) level master-slave clock signal.

In examples of the invention, a mechanism is described to time encode information (e.g. embed a RFS signal in a master-slave clock signal) using a multi-level LVDS (or CMOS) driver in a master device, and decode the time encoded (embedded signal) via a level detector in a LVDS (or CMOS) receiver in a slave device. In examples of the invention, an LVDS (or CMOS) receiver and demodulator circuit may be configured to implement a robust PVT-invariant edge detector to support a clock distribution and synchronization system for master-slave cascaded radar application. In this manner, additional information is distributed on the top of the LVDS (or CMOS) conventional transmission, with different possible signal levels and different pulse widths of signals both being representative of such additional information, and in accordance with examples of the invention received and demodulated at the LVDS (or CMOS) receiver and demodulator circuit.

Thus, examples of the invention may facilitate digital cascading radar units with increased phase aligned performance, where a single reference PLL may be used in a clock signal generation with embedded frame alignment of frame start signals within a MS clock for distribution between each master and slave device. This may ensure optimized phase coherence, sampling clock and chirp start signal alignment, which reduces system phase error, thereby allowing accurate range resolution.

Although examples of the invention are described with reference to synchronization in a star-connected master-slave architecture for a radar unit, it is envisaged that, in other examples, the techniques described herein may be applied to any kind of communication unit or system where several devices or ICs share the same sampling timing, and where another signal may be sent and received embedded within the clock, but synchronous to it (in this example radar scenario, this signal is the 'chirp start' signal).

Although examples of the invention are described with reference to a use of cascaded integrated circuits for, say, a phased array vehicular radar system with many transceiver circuits not located in a same IC, it is envisaged that the examples herein described may equally be employed in a phased array system for general wireless communication applications and units, such as base stations.

Next generation radar solutions will be based on a multi-chip transceiver configuration where a master device and several slave devices are cascaded coherently to increase the number of transmitter and receiver channels, thereby increasing sensor accuracy in angle resolution. Digital cascading is a preferable solution in order to circumvent the limitation of analog cascading in terms of misalignment of sampling clock of the ADCs and modulation ramp start signal (RFS) between different radar chips.

Figure 4:
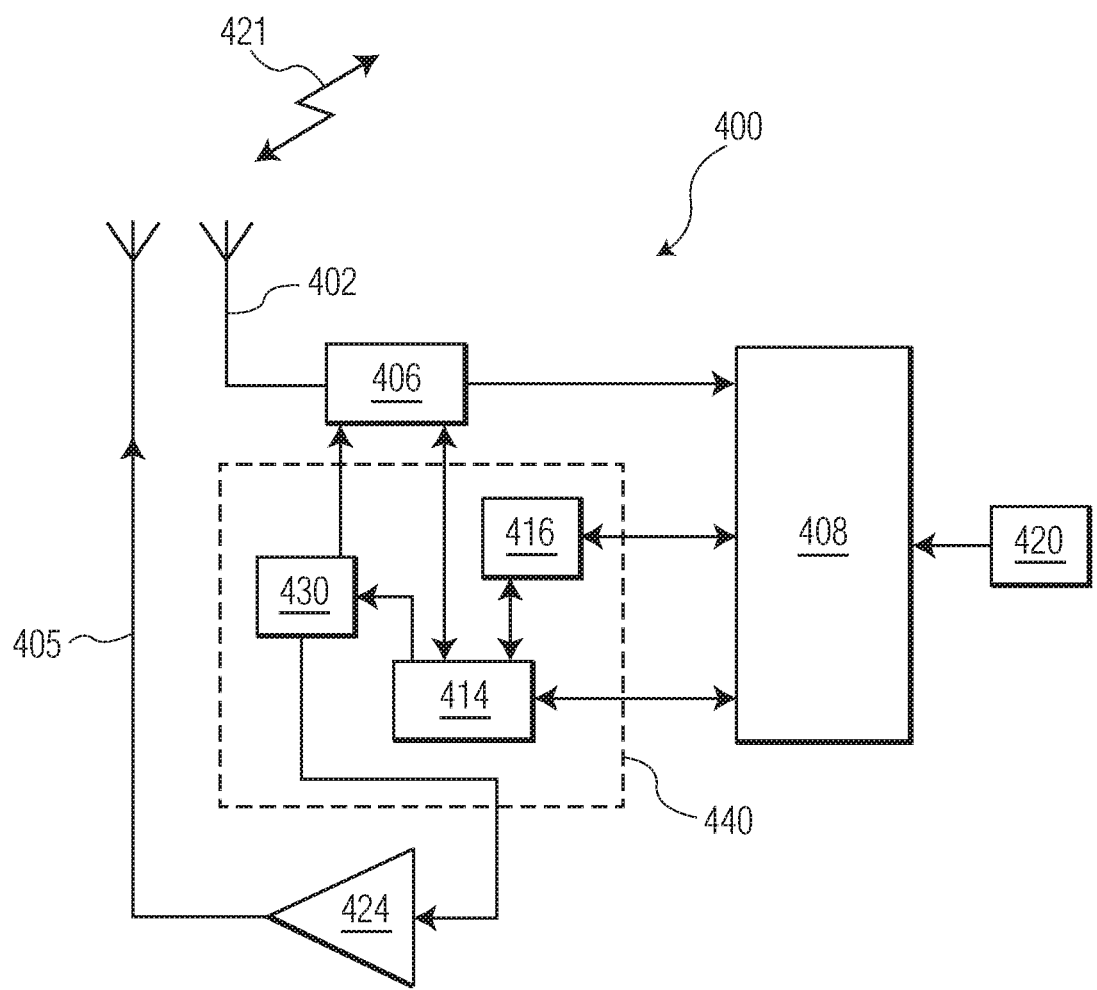
FIG. 4 illustrates an example block diagram of a radar unit adapted according to example embodiments of the invention.

Referring to FIG. 4, a block diagram of an example wireless communication unit is shown, adapted in accordance with some examples of the invention. Purely for explanatory purposes, the wireless communication unit is described in terms of a radar unit 400, for example operating at millimeter wave (mmw) frequencies. However, in other examples, it is envisaged that the concepts described herein may be employed in any communication unit that utilizes a master-device-slave device arrangement.

The radar unit 400 contains one or several antennas 402 for receiving radar signals 421, and one or several antennas 403 for transmitting radar signals, with one shown for each for simplicity reasons only. The number of antennas 402, 403 used may depend on the number of radar receiver and transmitter channels that are implemented in a given radar device. One or more receiver chains, as known in the art, include receiver front-end circuitry 406, effectively providing reception, frequency conversion, filtering and intermediate or base-band amplification, and finally an analog-to-digital conversion. In some examples, a number of such circuits or components may reside in signal processing module 408, dependent upon the specific selected architecture. The receiver front-end circuitry 406 is coupled to the signal processing module 408 (generally realized by a digital signal processor (DSP)). A skilled artisan will appreciate that the level of integration of receiver circuits or components may be, in some instances, implementation-dependent.

The microcontroller unit (MCU) 414 maintains overall operational control of the radar device 400, and in some examples may comprise time-based digital functions (not shown) to control the timing of operations (e.g. transmission or reception of time-dependent signals, FMCW modulation generation, etc.) within the radar unit 400. The MCU 414 is also coupled to the receiver front-end circuitry 406 and the signal processing module 408. In some examples, the MCU 414 is also coupled to a memory device 416 that selectively stores operating regimes, such as decoding/encoding functions, and the like.

As regards the transmit chain, this essentially comprises a power amplifier (PA) 424 coupled to the transmitter's one or several antennas 403, antenna array, or plurality of antennas. In radar unit 400, radar transceiver topology is different from traditional wireless communication architectures (e.g. Bluetooth™, WiFi™, etc.), as modulation occurs within a phase locked loop (PLL) (typically via a fractional-N divider), and is applied directly to the PA 424. Therefore, in some examples, the receiver front-end circuitry 406 and transmitter PA 424 are coupled to frequency generation circuit 430 arranged to provide radio frequency (RF) local oscillator (LO) signals. The generated RF LO signals are thus modulated directly to generate transmit radar signals, and also used to down-convert received modulated radar signals to a final intermediate or baseband frequency or digital signal for processing in a receive operation.

In examples of the invention, digital cascading of multiple master and slave devices is achieved by sending a reference clock signal generated in a master device to both other master device(s) and one or more slave device(s). In examples of the invention, the reference clock signal has been adapted by embedding a start of a frame (RFS) indication in the clock signal, which in some examples is a master-slave clock signal. In some examples, the generation and distribution of the MS clock signal with an embedded start of a frame indication may be implemented via a star connected LVDS (or CMOS) link, for example to reduce PCB skew and reduce signal reflections that could compromise signal integrity and increase jitter.

To remove any misalignment between RFS and the MS clock signal, as well as relax PCB requirements on the RFS signal, examples of the invention embed the RFS (sometimes referred to as a modulation chirp start) inside the master-slave clock signal, by adding an RFS modulator in a LVDS transmitter for generating a reference clock, and by adding an RFS demodulator at a LVDS receiver side, which is a focus of the present description. Thereafter, for example, amplitude modulation/demodulation may be used to retrieve the RFS signal, advantageously without a need for one or more dedicated RFS pin(s).

In accordance with examples of the invention, the use of improved synchronization between respective master device(s) and one or more slave device(s) may then allow correct operation of the communication unit, e.g., that implements an N-unit phased array FMCW imaging radar system. For identical units, the use of a phased array increases the sensitivity by 'N' times, as compared to that of a single unit. In a radar transmitter mode of operation, beam steering can also be implemented by shifting the phase of the transmitting signals of an N-unit phased array radar system. For multiple mid-range radar units, the inputs to an N-unit phased array radar system can be combined in order to increase the radar transmit power, and thereby allow longer range applications. Such benefits may result from the use of improved synchronization between respective master device(s) and one or more slave device(s).

In one example of the invention, the embedding of a chirp start signal within a dock signal, which is shared between the master device(s) and slave device(s) (or ICs) in order to maintain synchronization, may result in an enabling of more flexible PCB design without the constraints of a strict transmission line or connection length between the master device(s) and slave device(s). Furthermore, a smaller MCU for, say, a phased array FMCW imaging radar system, may be achieved by eliminating a need for an additional one pin on MCU (when the RFS is provided by the MCU in the known architecture (ii)) or two dedicated RFS pin(s) on the master device (when the RFS is provided by the master device in known architecture (i)).

Some examples of the invention employ synchronization in order to minimize any delay mismatch in either the LO/frequency generation circuitry and/or analog-to-digital converter (ADC) sampling instants (which would ordinarily have led to angle estimation errors) as well as transmit control, frequency chirp start control signals. Examples of the invention employ synchronization in an FMCW radar unit, particularly to align the frequency chirp start and end frequencies.

Furthermore, examples of the invention allow multiple radar transceiver chips to be located on different PCBs or modules in order to reduce installation complexity in a constructing of an adaptive phased array FMCW imaging radar system on a non-planar vehicle surface. Clearly, the various components within the radar unit 400 can be realized in discrete or integrated component form, with an ultimate structure therefore being an application-specific or design selection. A skilled artisan will appreciate that the level of integration of circuits or components may be, in some instances, implementation-dependent.

Figure 5:
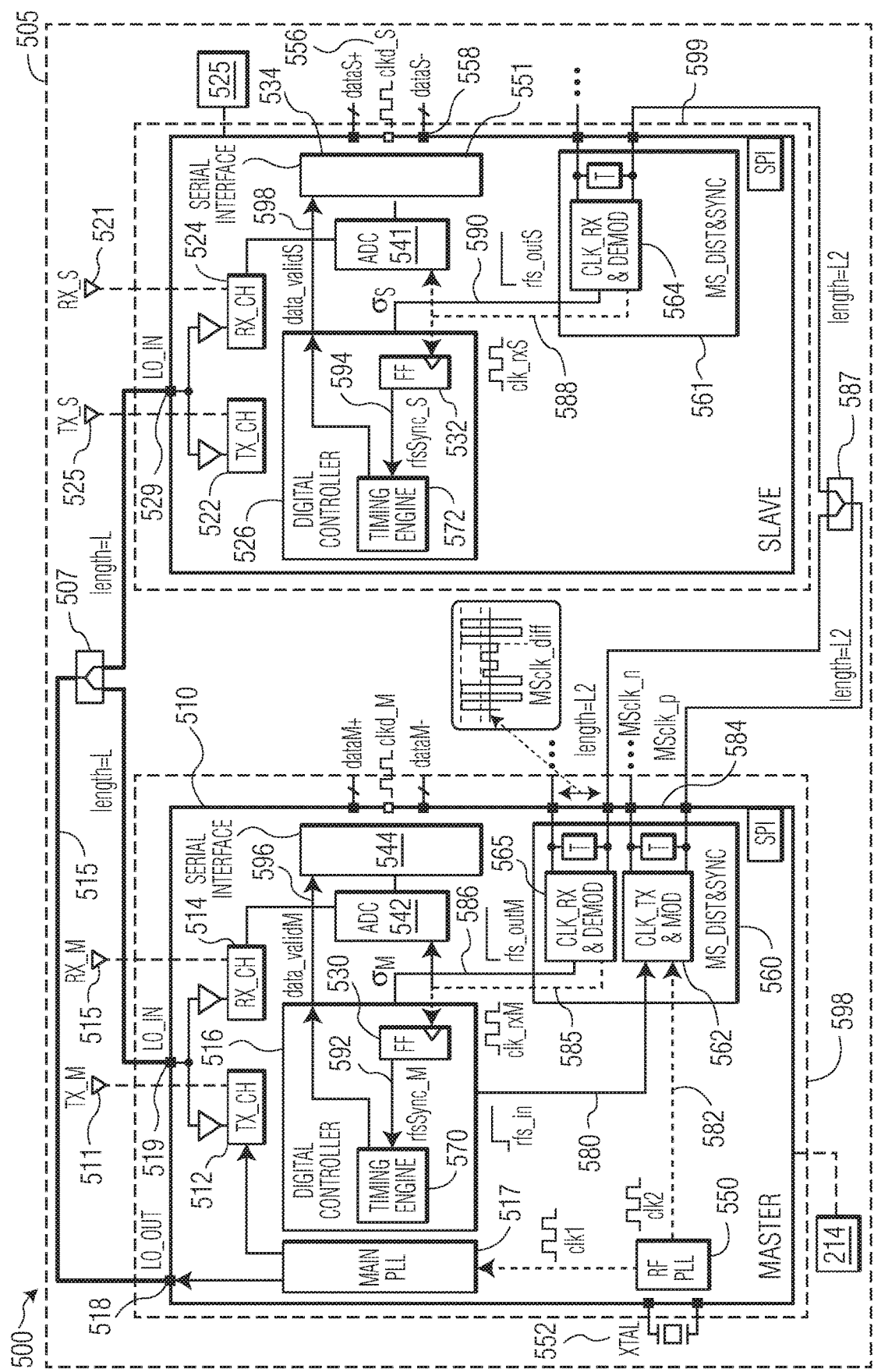
FIG. 5 illustrates an example diagram of a radar unit that cascades multiple chips in a Master Slave synchronization approach, according to example embodiments of the invention.

Referring now to FIG. 5, an example block diagram of a communication unit 500 having a master-slave architecture is illustrated. In this example, the master-slave architecture is illustrated as a radar unit 505 that includes a master device 510 and one or multiple slave devices 520, 523. One slave device 520 is shown for clarity purposes only, with the potential for other similar slave devices shown as 523.

In this example, the master device 510 incorporates a radar transceiver formed by at least a frequency generation circuit, which in this example includes a reference phase locked loop (PLL) 550 and a main PLL 517. An output from the main PLL 517 provides a local oscillator (LO) signal to a local oscillator output pin 518, which is routed via a LO_out path 515 to a RF splitter 507 that is coupled to each master and slave LO input pin (LO_in) 519, 529 via, say, an equal transmission line length (e.g. via a star configuration). In some examples, by using equal transmission line lengths, it is possible to ensure equal delay and phase aligned signals for the LO, applied across all master device(s) 510 and slave devices 520, 523 for the generation and reception of radar signals.

The master device 510 further includes a digital controller 516 and a transmitter circuit 512 comprising one to several transmitter channels (TX_CH) and a receiver circuit 514 comprising one to several receiver channels (RX_CH). In a transmitter mode of operation in the master device 510, the digital controller 516 may provide a transmit radar signal to the main PLL 517 to generate a modulated transmit signal. The modulated transmit signal is then optionally passed to a buffer or frequency multiplier in the transmitter circuits 512, 522 (if the generated signal is not at the operating frequency of the radar unit 505) of the respective master device(s) 510 and slave device(s) 522. A high-frequency output of the transmitter circuit 512 is passed to a power amplifier, say, via a phase shifter circuit (both not shown), where it is amplified within transmitter circuit 512 and routed to the one or more transmitter antenna(s) 511 (and in some examples routed to the one or more transmitter antenna(e) 525 in the one or more slave device(s) 520.

In a receiver mode of operation in the master device 510 and slave device 520, a received radar signal may be received at the one or more receiver antenna(s) 513, 521 and passed to master and slave receiver circuits 514, 524 that include a low noise amplifier (LNA) configured to amplify the received radar signal. The amplified received radar signal is passed to a down-mixer, where it is mixed with the received high-frequency LO signal 515 received from the master device 510.

The master device 510 further includes one or more programmable bandpass filter(s) and one or more gain amplifiers (not shown), as well as one or several ADC(s) 542 that is/are coupled to the one to several receiver channels (RX_CH) 514 as well as a serial interface 544. The one or several ADC(s) 542 process a relative narrow band signal, for example in a range between a few kHz up to tenths of MHz.

In accordance with examples of the invention, the master device 510 further includes a master-slave clock distribution and synchronization circuit 560. In this example, the reference clocks are generated on the master device 510 using the reference PLL 550, tied to an external crystal oscillator 552, and sent as a first clock signal (clk1) to the main PLL 517 and a master-slave dock signal (clk2) 582 to master-slave clock distribution and synchronization circuit 560.

In this example, the master-slave distribution and synchronization circuit 560 is configured to embed a frame start signal, such as a chirp start (RFS_in) signal 580 in a radar unit, into the master-slave clock signal (clk2) 582 received from reference PLL 550. Embedding the chirp start (RFS_in) signal 580 into the master-slave clock signal (clk2) 582 allows the two signals to be distributed across all master slave devices with inherent synchronization and effectively no delay between devices. In this example, the result of the embedding operation is a (distributed and received modulated) differential master-slave clock signal 584. In this example, master-slave distribution and synchronization circuit 560 uses a RFS modulator 562 (implemented in, say, a LVDS transmit circuit) to embed the chirp start (RFS_in) signal 580 into the master-slave clock signal (clk2) 582, and a RFS demodulator 564 (implemented in, say, a LVDS receive circuit) to respectively de-embed (e.g. demodulate) the differential master-slave clock signal 584 into a slave RFS_out signal 590 and a master-slave slave clock signal 588. Similarly, in the master device, a fed back (distributed and received modulated) differential master-slave clock signal 584 is also received in master-slave clock distribution and synchronization circuit 560.

In response to a serial-parallel interface (SPI) command coming from the MCU 214, the digital controller 516 of the master device 510 provides a chirp start signal (rfs_in) 580 that will be used by each master device 510 and slave device 520, 523 of the radar unit 505. The rfs_in signal 580 is provided to the master-slave clock distribution and synchronization circuit 560, and it is embedded on the master-slave clock signal (clk2) 582 by the RFS modulator 562. In this example, the RFS modulator 562 is an LVDS transmitter circuit that produces a modulated/embedded output LVDS signal. In one example, as illustrated, the modulated/embedded output LVDS signal may be a differential master-slave clock synchronization signal with embedded RFS signal 584 (MSclk_n & MSclk_p). In this example, the RFS modulator 562 (and RFS demodulator 564) may be terminated by a 100 ohms differential resistor (T), as well as all other slave LVDS clock RFS demodulators, in order to reduce any reflections due to LVDS link asymmetry, which may corrupt the signal integrity and cause false zero crossings.

In accordance with examples of the invention, the differential master-slave clock synchronization signal with embedded RFS_in signal 584 (i.e. containing both clock & chirp start) may then be propagated to a number/all devices of the radar unit 505 via an equal length (L2) star connection and splitter 587, in order to limit any printed circuit board (PCB) skew or PCB asymmetries to very low values (e.g. of the order of <100 psec).

In this example, each radar slave device 520, 523 includes a digital controller 526 and a transmitter circuit 522 comprising one to several transmitter channels (TX_CH) and a receiver circuit 524 comprising one to several receiver channels (RX_CH). The slave device 520 further includes one or several ADC(s) 541 that is/are coupled to the one to several receiver channels (RX_CH) 524 as well as a serial interface 534. In accordance with examples of the invention, the slave device 520 further includes a slave-based master-slave clock distribution and synchronization circuit 561, where only the LVDS receiver is enabled. In this example, the slave-based master-slave distribution and synchronization circuit 561 is configured to demodulate and extract the chirp start (RFS) signal 580 from the differential master-slave clock synchronization signal with embedded RFS_in signal 584. In this example, slave-based master-slave distribution and synchronization circuit 561 uses an RFS demodulator 564 implemented in LVDS.

In some examples, as appreciated by a skilled person, the slave device 520 may be configurable as a master device 510, but with a number of circuits or components or functionality disabled. For example, in such a slave device 520, since the clock and sync signal as well as LO signals are received from the master device 510, a slave reference PLL, main PLL and the MS_CLK transmit circuits are disabled. Many other blocks may be present inside the slave device, but are not mentioned herein to avoid obfuscating concepts of the invention.

Figure 8:
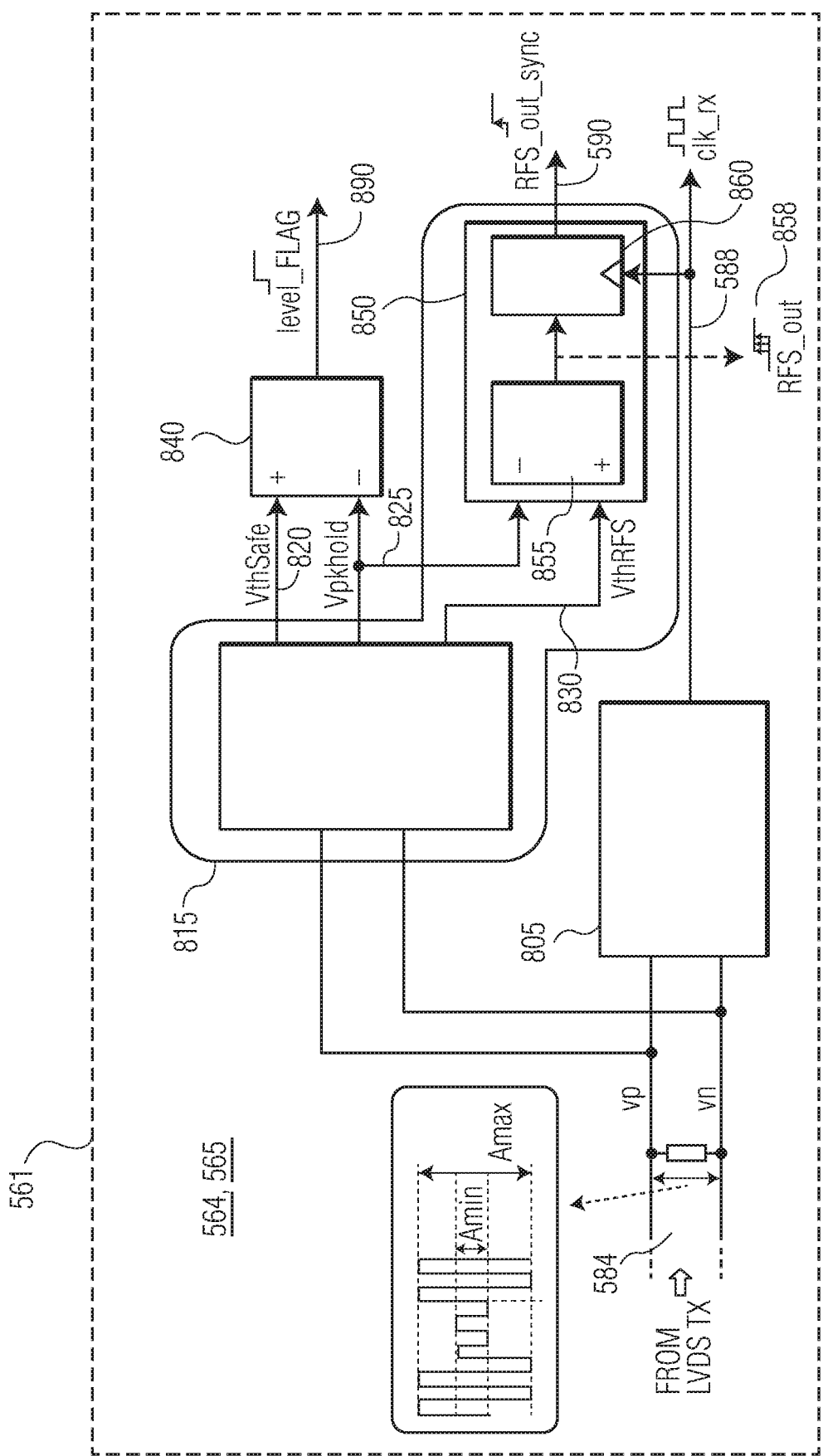
FIG. 8 illustrates an example LVDS receiver Chirp Start demodulator and safety detector circuit, according to example embodiments of the invention.

As described in greater detail with respect to FIG. 8, the respective RFS slave demodulator 564 is configured to extract respective slave clock signals (clk_rxS 588) in a CMOS format with very low delay variation between that clock and the master clock signal (clk_rxMS 585). In addition, the respective RFS demodulators 564, 565 are configured to demodulate the transmitted chirp start signal (rfs_in 580) in each respective device. Since the respective RFS master modulator 585, generates the clock signal (clk_rxM) and RFS master demodulator 565 and RFS slave demodulator 564 demodulate the respective master clock signals (clk_rxM 585) and slave clock signals (dk_rxS 588) that are very closely aligned, they are used to re-sample the respective master (rfs_outM) 586 and slave (rfs_outS) 590 device chirp output signals. In this manner, the RFS master demodulator 565 and RFS slave demodulator 564 create synchronized chirp start signals (rfsSync_M 592, rfsSync_S 594) at respective inputs at time engines 570, 572. In this example, in the slave device, this sampling operation is performed in the digital domain, inside respective digital controller 526, by flip-flop 532. In the master device, this sampling is performed inside digital controller 516, by flip-flop 530.

A skilled artisan will appreciate that many other circuits, components and blocks may be present inside a master device 510 and slave device 520, but that these have been omitted purely for clarity purposes. In this manner, a system, such as a phased array FMCW imaging radar system, employing example embodiments of the invention relating to a master-slave arrangement, may be able to benefit from improved clock synchronization accuracy in a multiple chip configuration.

In some examples, the master device 510 is configured to generate and distribute a master-slave clock 584 from a MS_clock LVDS transmit modulator 526 path to the MS_clock LVDS receive path inside slave devices, and back to master device LVDS RX demodulator 564, in, say, a star configuration. In this manner, in some examples, an ADC clock applied to both master device(s) and slave devices may be perfectly aligned, so long as the transmission line length to each of the receivers is matched. Furthermore, in some examples, the clock signal with an embedded start of a frame indication may be used to sample the data inside different ADCs belonging to different ICs, in order to reduce phase error and consequently angle resolution at sensor level.

Also for example, in one embodiment, the illustrated examples of a master device 510 or slave device 520 may be implemented as circuitry located on a single integrated circuit 598, 599. Alternatively, the circuit and/or component examples may be implemented as any number of separate integrated circuits 598, 599 interconnected with each other in a suitable manner. The specifications and drawings are, accordingly, to be regarded in an illustrative rather than in a restrictive sense.

Figure 6:
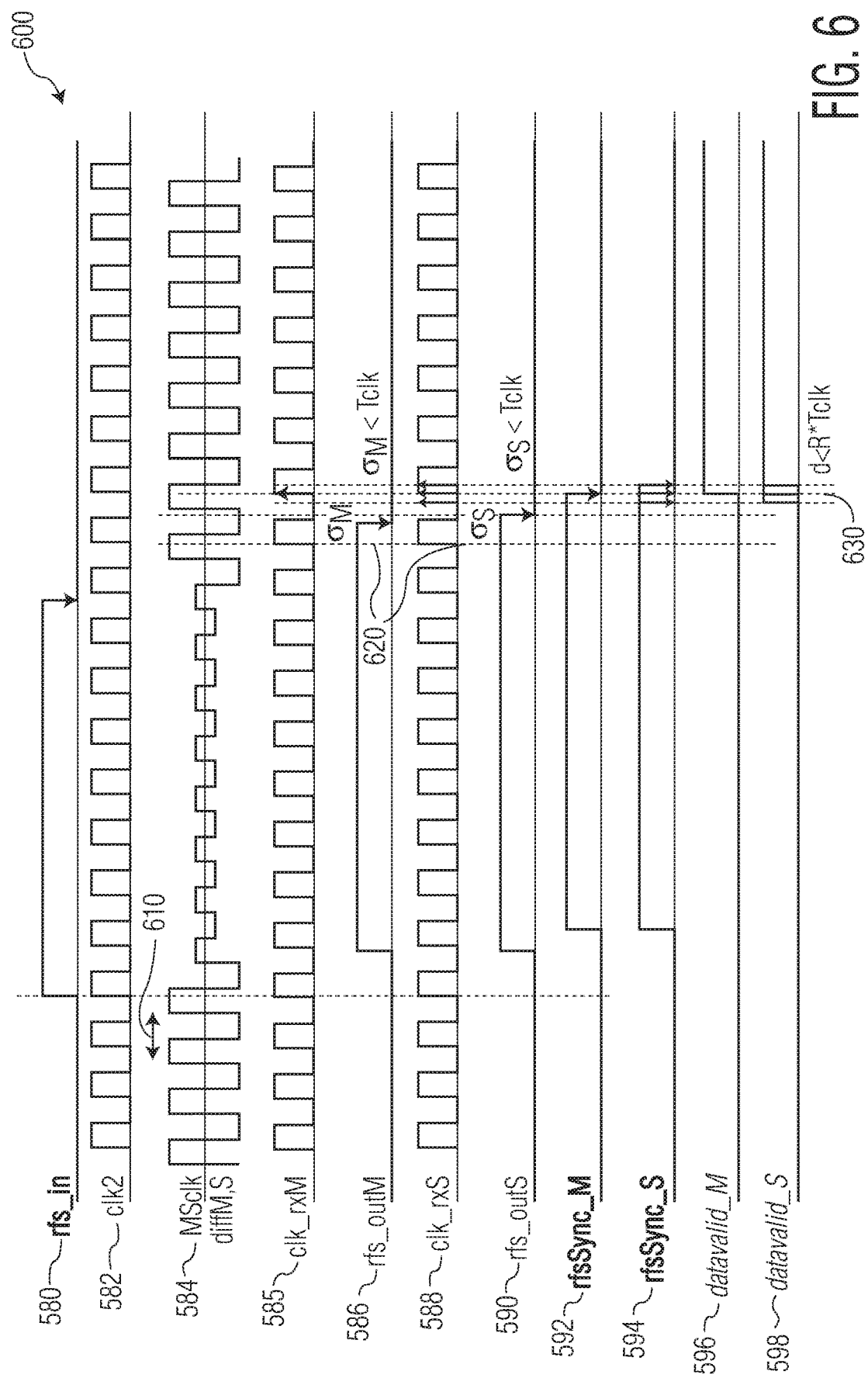
FIG. 6 illustrates a timing diagram of a synchronization method, according to example embodiments of the invention.

Referring now to FIG. 6 (and with reference to FIG. 5), a timing diagram 600 of a synchronization method between master device and one or more slave device(s) is illustrated, according to example embodiments of the invention. In order to obtain phase coherence in, say, a master-slave arrangement based radar unit, such as radar unit 505 of FIG. 5, local oscillator (LO) and clock signals are shared between all devices of the radar unit. In accordance with examples of the invention, the LO signal is provided from the master device (via a LO_out path/pin 518) to each LO_in path/pin 519, 529 present in both master device(s) 510 and slave device(s) 520, 523. In this case, LO_out signal is star routed using equal length (L) transmission/communication lines and power splitters to guarantee phase aligned signals.

The reference clocks are generated on master device 510 using the reference PLL clock signal (clk2) 582, tied to an external crystal oscillator 552, and sent to RFS modulator 560. Under, say, a SPI command from the MCU 414, the digital controller 516 of the master device 510 provides a chirp start (RFS_in) signal 580 to the RFS modulator circuit 560, which is configured to embed (e.g. encapsulates) the chirp start (RFS_in) signal 580 into the master-slave clock signal (clk2) 582 received from reference PLL 550. In this example, the embedded chirp start (RFS_in) signal 580 takes a form of differential master-slave clock signal (MS_clkdiff) 584, which is then used by all the master device(s) 510 and slave devices 520 of the system. In FIG. 5, the RFS modulator circuit 560 may be an LVDS transmitter and the differential master-slave clock signal (MS_clkdiff) 584 may take a form of an LVDS signal. MSclk_n & MSclk_p.

In some examples, the use of LVDS facilitates programmability of output voltages and supports very high data speeds. In some examples, LVDS may be employed in order to reduce interference or signal pollution between supplies due to current spikes if CMOS logic were used.

This differential master-slave clock signal (MS_clkdiff) 584 containing clock & chirp start is then transmitted by the master device 510 to all devices of the system, and is received by both master device(s) 510 and slave devices 520. Master-slave clock distribution and synchronization circuits 560, 561 are configured to extract the clock signals (clk_rxM 585 & clk_rxS 588) in a CMOS format with very low delay variation between both clocks, as well as to demodulate the transmitted chirp start signal (RFS_in) 580 in both the master device(s) 510 (to produce a reproduced chirp start signal rfs_outM 586) and slave devices 520 (to produce a reproduced chirp start signal rfs_outS 590). Since the respective clock signals present a very good alignment, as illustrated, advantageously with very low absolute delay and delay variations, they are used to re-sample the reproduced chirp start signals rfs_outM 586 & rfs_outS 590. In this manner, synchronized chirp start signals (rfsSync_M 592 and rfsSync_S 594) are created at inputs to the respective time engines 570, 572. In some examples, this sampling is performed in the digital domain, inside digital controller 516, 526 by flip-flops 530, 532.

In some examples, in order to obtain this re-sampling in a digital domain, at least one of the at least one master device clock receiver and demodulator 560, and at least one slave device clock receiver and demodulator 561 may be arranged such that clock extraction circuitry that generate signals (clk_rxM, clkrxS) do not introduce a problematic delay (σM, σS 620) due to, say, any of process, voltage, temperature (PVT) variations, for example where the variations during a communication unit design phase are constrained to be smaller than one clock cycle (Tclk) 610, to avoid introducing re-sampling errors on RFS_signals (rfs_outM, rfs_outS). In some examples, a dock extraction circuitry generates signals (clk_rxM, clkrxS) that are only allowed to introduce a delay (σM, σS<Tclk 620) of up to half of a clock period of the system clock signal (388, 585) due to any of process, voltage, temperature, PVT variations. The inventors of the present invention have identified that a more acceptable ratio is one eighth of a clock period delay of the system clock signal 588, 585. Any variability is well controlled to guarantee that the datavalid signals (datavalidM 596, datavalidS 598), which are used to set sampling time of data at ADC side, are accurately time aligned on all master device(s) and slave devices, with a maximum delay (d) defined by the overall radar phase variation specification (d=<R*Tclk) 630.

In one example operation, it is envisaged that the radar units that include a built-in inter-chip localization feature may be employed in radar units in vehicles. Examples of the invention may be additionally employed to support beam steering control in a phased array radar system across multiple sensors, in some examples having multiple chips.

Examples of the invention propose a method for clock distribution and synchronization in a communication unit having at least one master device and at least one slave device configured in a master-slave arrangement and configured to process at least one of: transmit signals, and receive signals. The method includes, at a master device: generating a system clock signal and generating a frame start signal. The method further includes embedding the frame start signal into the system clock signal to produce a modulated embedded master-slave clock signal. The modulated embedded master-slave dock signal is then transmitted to at least one slave device to synchronise the system clock signal and a frame start signal between the at least one master device and at least one slave device.

Figure 7:
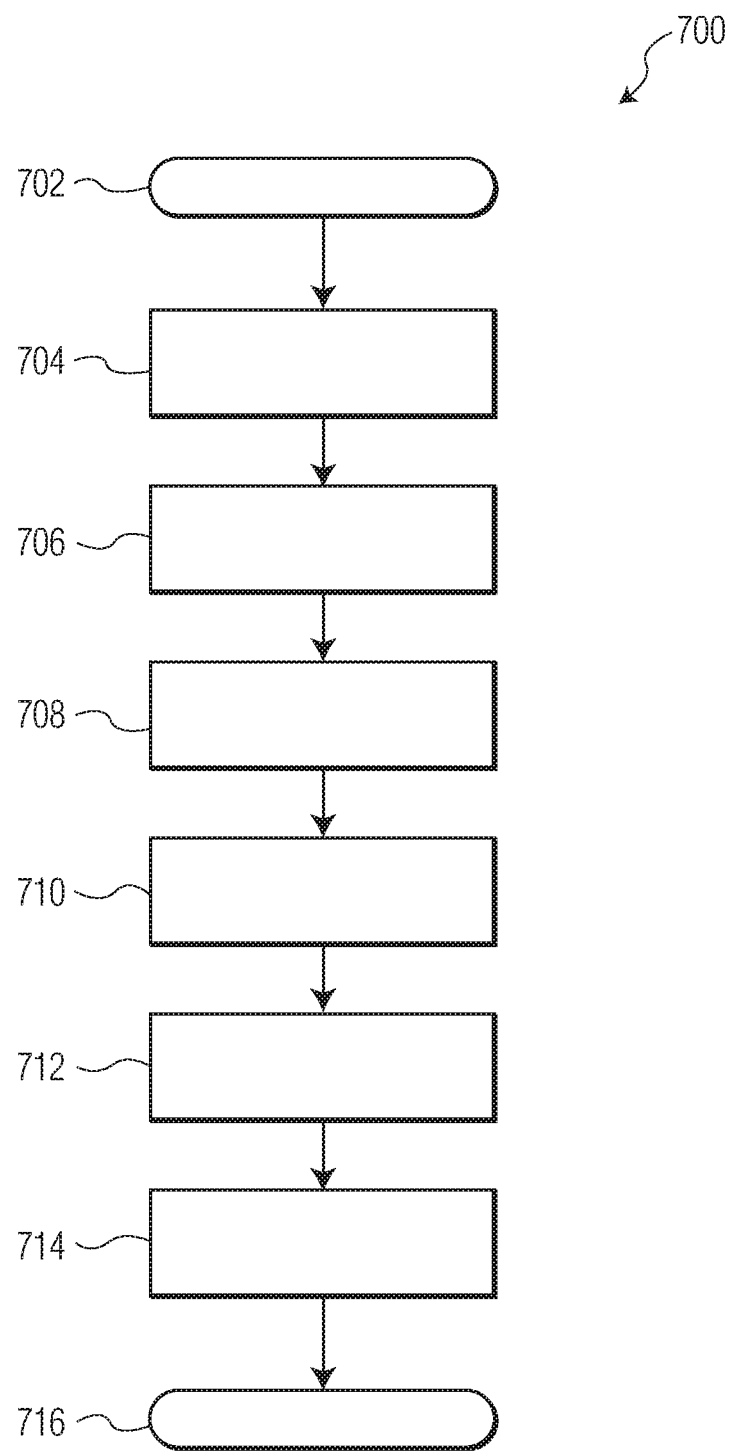
FIG. 7 illustrates an example flowchart of the steps associated with synchronization across multiple master device(s)-slave device(s), according to example embodiments of the invention.

Referring now to FIG. 7 an example flowchart 700 of the steps associated with synchronization across multiple master device(s)-slave device(s) is illustrated, according to example embodiments of the invention. The flowchart starts at 702, with a start-up of at least the master device and/or a MCU. At 704, the reference phase locked loop (PLL) of the radar unit is initiated. In some examples, at 704, a clock signal is sent to master device(s) and slave device(s) and the MCU. In one example at 706, a main PLL is initiated and a waveform generator of a master device controls its VCO to output a LO signal with a fixed frequency that is proportional to a chirp start frequency, $f_{start\_master}$. In one example application, one or more slave device(s) are initiated to receive the signal from the master device, and accordingly adjust their LO frequency to be the same as that in the master device.

In examples of the invention, at 708, a master device starts a FMCW ramp signal and embeds a RFS_in signal within a MS clock signal. In some examples, the MS clock signal is then sent to all other master device(s) and slave device(s). At 710, the MS clock signal with an embedded RFS_in signal is received and demodulated in each of the master device(s) and slave device(s). At 712, the ramp (chirp) signal starts in each of the master device(s) and slave device(s). At 714, each of the master device(s) and slave device(s) receive a representation of an echo signal and send validated, demodulated data to the MCU based on the synchronised clock signal with an embedded RFS_in signal. In this manner, synchronization between the master device(s) and slave device(s) is achieved, after which, all the master device(s) and slave device(s) have the same frequency chirp start and chirp end frequencies, as well as the same sampling clock. The data sampled by all of the devices (or ICs) including the ADC is now substantially synchronous. The flowchart ends at 716.

FIG. 8 illustrates an example LVDS (slave-based or master-based) master-slave clock distribution and synchronization circuit 561. In this example, the slave-based master-slave clock distribution and synchronization circuit 561 includes a more detailed example of a RFS demodulator 564, 565 that includes receiver chirp-start amplitude modulator (AM) demodulator and a safety detector circuit, according to example embodiments of the invention. The slave-based master-slave clock distribution and synchronization circuit 561 and RFS demodulator 564, 565 may be included in either or both of the slave device 520 or master device 510 of FIG. 5.

Figure 3:
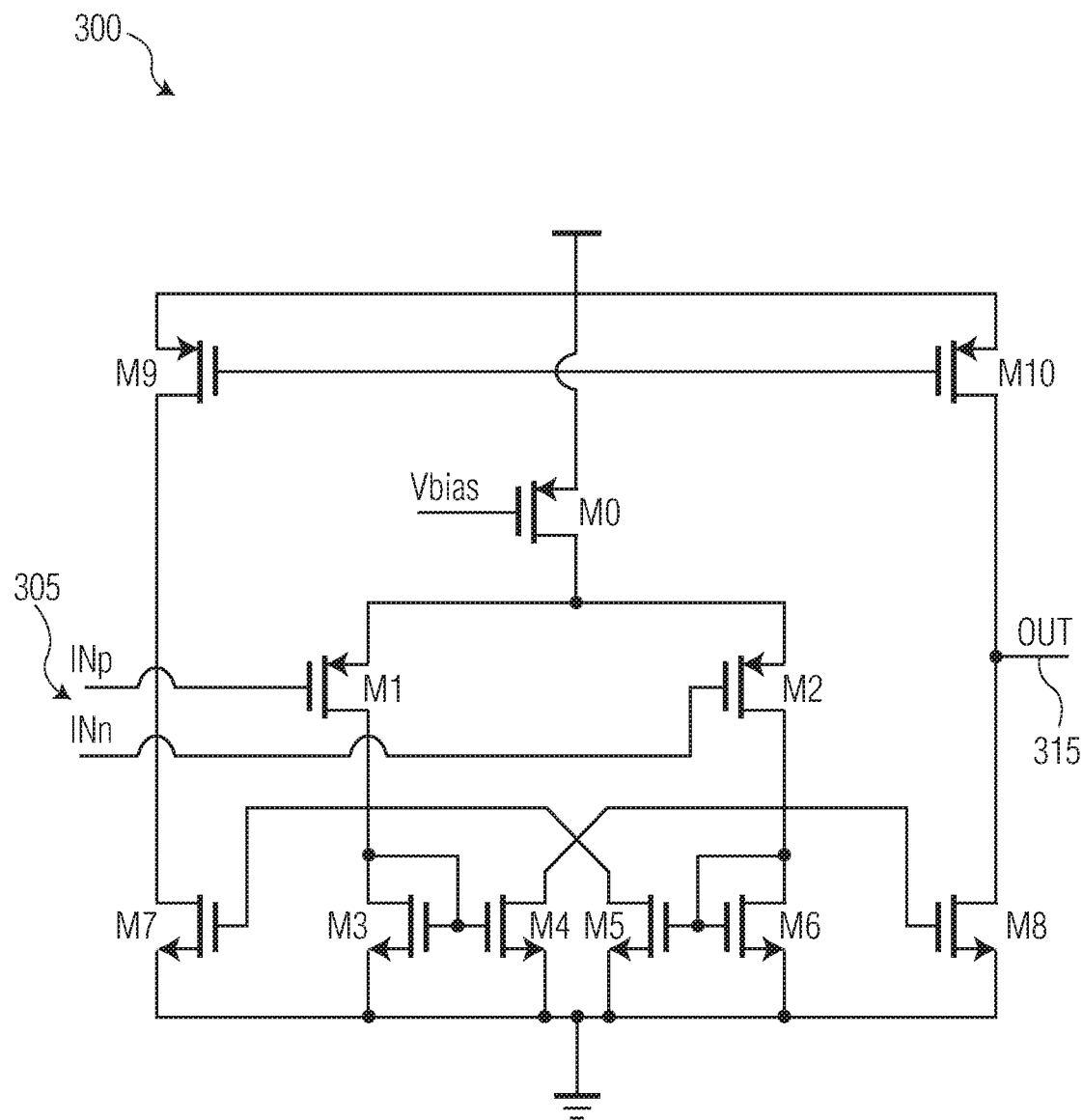
FIG. 3 illustrates a known LVDS receiver circuit having a comparator with hysteresis.

In this example, the RFS demodulator 564, 565 receives a distributed, modulated differential master-slave clock signal 584 from a master device. In this example, master-slave distribution and synchronization circuit 561 uses a RFS demodulator 564, 565 implemented in, say, a LVDS receive circuit to respectively de-embed (e.g. demodulate) the differential master-slave clock signal 584 into a slave RFS_out signal 590 and a master-slave slave clock signal 588. In this example, the received distributed, modulated differential master-slave clock signal 584 is input to a LVDS to CMOS converter circuit 805, which is typically implemented as a buffer or comparator with hysteresis in the known prior art, such as that described in FIG. 3. However, in examples of the invention, very low PVT variations are tolerated by careful sizing of the buffer in the LVDS to CMOS converter circuit 805, and thereby it' associated delay, in order to ensure an output master-slave slave clock signal 588 ('clk-rx') with a delay variation lower than % of the clock period (Tclk). Thus, the introduced buffer delay is important since this clock is used later to resample the RFS on all devices.

In this example, the received distributed, modulated differential master-slave clock signal 584 is also input to a fast and accurate differential peak (or edge) detector & threshold generator 815. The fast and accurate differential peak (or edge) detector & threshold generator 815 may be an amplitude detector configured to track a low to high transition of the input received distributed, modulated differential master-slave clock signal 584. In examples of the invention, the fast and accurate differential peak (or edge) detector & threshold generator 815 needs to be configured to detect a signal rise time of much lower than a signal clock period (Tclk), e.g. (<⅛ of Tclk), over all potential PVT conditions.

In examples of the invention, the fast and accurate differential peak (or edge) detector & threshold generator 815 generates a 'Vpkhold' signal 825 that is representative of the differential input amplitude level of the received distributed, modulated differential master-slave clock signal 584. The 'Vpkhold' signal 825 is provided to both a latched comparator circuit 850 and a safety level comparator circuit 840.

A threshold generator within the fast and accurate differential peak (or edge) detector & threshold generator 815 is configured to generate a safety level voltage reference threshold 'VthSafe' 820 to be used by the safety level comparator circuit 840. The safety level comparator circuit 840 is configured to track the input signal level of the received distributed, modulated differential master-slave clock signal 584, e.g. by comparing a peak voltage held signal 825 with the safety level voltage reference threshold 'VthSafe' 820 and register a warning, e.g. a flag 890 or a warning pulse or signal, if the received distributed, modulated differential master-slave clock signal 584 falls below a threshold predefined voltage level at the LVDS RFS demodulator 564, 565, thereby ensuring a minimum amplitude is achieved. A minimum amplitude may be needed to ensure that the phase noise and/or jitter specifications may be achieved.

In some examples of the invention, it is envisaged that the AM levels may be programmable in the RFS modulator in the master device. In such a scenario, it is envisaged that the RFS demodulator may also be adapted to operate with different or varying threshold levels for example RFS threshold reference signal 'VthRFS' 830 and/or safety level voltage reference threshold 'VthSafe' 820. In some examples, it is envisaged that these threshold levels employed in the RFS demodulator 564, 565, for example RFS threshold reference signal 'VthRFS' 830 and/or safety level voltage reference threshold 'VthSafe' 820, may be programmable. In examples of the invention, the safety level voltage reference threshold 'VthSafe' 820 is always maintained to be below the minimum signal level used for modulating the RFS threshold reference signal 'VthRFS' 830, with some margin, in order to avoid safety detector flagging 890 during reception of the RFS signal (amplitude modulated with a $V_{low} \rightarrow V_{high}$ transition.

In this example, the latched comparator circuit 850 includes a RFS comparator 855 and a latch circuit 860. In examples of the invention, the threshold generator within the fast and accurate differential peak (or edge) detector & threshold generator 815 is configured to generate a RFS threshold reference signal 'VthRFS' 830 that is provided to the RFS comparator 855 as well as the 'Vpkhold' signal 825. In this manner, the latched comparator circuit 850 is configured to function as an edge detector by comparing the 'Vpkhold' signal 825 output from the peak detector to the RFS threshold reference signal 'VthRFS' 830, thereby indicating when a low to high transition of the received distributed, modulated differential master-slave clock signal 584 occurs. Thus, the output from the latched comparator circuit 850 is a signal that represents the demodulated RFS ('RFS_out'), accurately latched by latch 860 to the LVDS demodulated clock ('clk_rx') in such a way that variations in the RFS signal and clock signals between master device(s) 510 and slave device(s) 520 are re-synchronized and timing synchronization errors reduced to a minimum.

In some examples of the invention, the above timing synchronization improvement may be possible due to the robust PVT-invariant LVDS to CMOS converter circuit 805, where clock edge variations over PVT are much lower than the clock period (Tclk, for example of the order of <<¼ Tclk). This may be achieved due to correct sizing of the transistors inside the LVDS to CMOS converter circuit 805. For example, in some examples and relative to temperature, it is envisaged that a supply voltage (e.g. through a dedicated LDO) that is not flat over temperature, but has a slope over temperature, may be provided to a buffer stage in the LVDS to CMOS converter circuit 805 to compensate for this variation. Alternatively, for example if any variation was because of process, it is envisaged that an offset may be applied to the same supply voltage to accommodate some process variations (for example by measuring a current Vbg/R, an RC circuit and/or a frequency of a ring oscillator (not shown) in the receiver).

Figure 9:
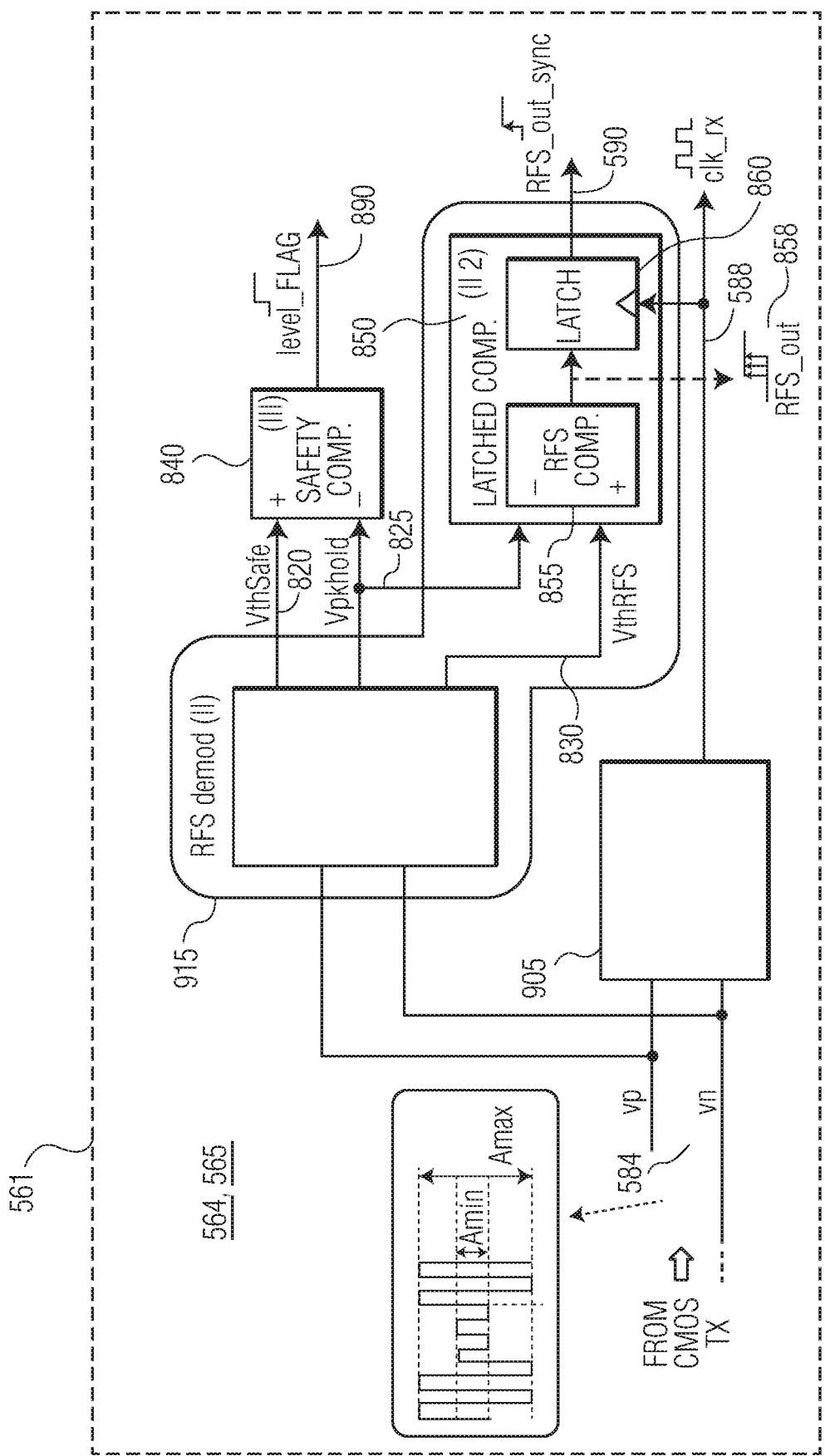
FIG. 9 illustrates an alternative example of a CMOS receiver Chirp Start demodulator and safety detector circuit, according to example embodiments of the invention.

FIG. 9 illustrates an alternative example of a master-slave clock distribution and synchronization circuit 561. In this example, the slave-based master-slave clock distribution and synchronization circuit 561 includes a more detailed example of a RFS demodulator 564, 565 that includes a differential CMOS (slave-based or master-based) receiver chirp start demodulator and safety detector circuit, according to example embodiments of the invention. The slave-based master-slave clock distribution and synchronization circuit 561 and RFS demodulator 564, 565 may be included in either or both of the slave device 520 or master device 510 of FIG. 5.

In this example, the RFS demodulator 564, 565 receives a distributed, modulated differential master-slave clock signal 584 from a master device. In this example, master-slave distribution and synchronization circuit 561 uses a RFS demodulator 564, 565 implemented in, say, a CMOS differential receive circuit, to respectively de-embed (e.g. demodulate) the differential master-slave dock signal 584 into a RFS_out signal 590 and a master-slave clock signal 588. In this example, the received distributed, modulated differential master-slave clock signal 584 is input to a CMOS buffer 805. However, in examples of the invention, very low PVT variations are tolerated by careful sizing of the buffer in the CMOS buffer 805, and thereby its associated delay, in order to ensure an output master-slave clock signal 588 ('ck-rx') with a delay variation lower than ¼ of the clock period (Tclk). Thus, the introduced buffer delay is important since this clock is used later to resample the RFS on all devices.

In this example, the received distributed, modulated differential master-slave clock signal 584 is also input to a fast and accurate CMOS differential level detector and threshold generator 915. The fast and accurate CMOS differential level detector and threshold generator 915 may be an amplitude detector configured to track a low to high transition of the input received distributed, modulated differential master-slave clock signal 584. In examples of the invention, the fast and accurate CMOS differential level detector and threshold generator 915 needs to be configured to detect a signal rise time of much lower than a signal clock period (Tclk), e.g. (<⅛ of Tclk), over all potential PVT conditions.

In examples of the invention, the fast and accurate CMOS level detector and threshold generator 915 generates a 'Vpkhold' signal 825 that is representative of the differential input amplitude level of the received distributed, modulated differential master-slave clock signal 584. The 'Vpkhold' signal 825 is provided to both a latched comparator circuit 850 and a safety level comparator circuit 840.

A threshold generator within the fast and accurate CMOS level detector and threshold generator 915 is configured to generate a voltage reference 'VthSafe' 820 to be used by the safety level comparator circuit 840. The safety level comparator circuit 840 is configured to track the input signal level of the received distributed, modulated differential master-slave clock signal 584, e.g. by comparing a peak voltage held signal 825 with the safety level voltage 'VthSafe' 820 and register a warning, e.g. a flag 890 or a warning pulse or signal, if the received distributed, modulated differential master-slave clock signal 584 falls below a threshold predefined voltage level at the CMOS RFS demodulator 564, 565, thereby ensuring a minimum amplitude is achieved. A minimum amplitude may be needed to ensure that the phase noise and/or jitter specifications may be achieved.

In this example, the latched comparator circuit 850 includes a RFS comparator 855 and a latch circuit 860. In examples of the invention, the threshold generator within the fast and accurate CMOS level detector and threshold generator 915 is configured to generate a RFS threshold reference signal 'VthRFS' 830 that is provided to the RFS comparator 855 as well as the 'Vpkhold' signal 825. In this manner, the latched comparator circuit 850 is configured to function as an edge detector by comparing the 'Vpkhold' signal 825 output from the peak detector to the RFS threshold reference signal 'VthRFS' 830, thereby indicating when a low to high transition of the received distributed, modulated differential master-slave clock signal 584 occurs. Thus, the output from the latched comparator circuit 850 is a signal that represents the demodulated RFS ('RFS_out'), accurately latched by latch 860 to the CMOS demodulated clock ('clk_rx') in such a way that variations in the RFS signal and clock signals between master device(s) 510 and slave device(s) 520 are re-synchronized and timing synchronization errors reduced to a minimum.

Figure 10:
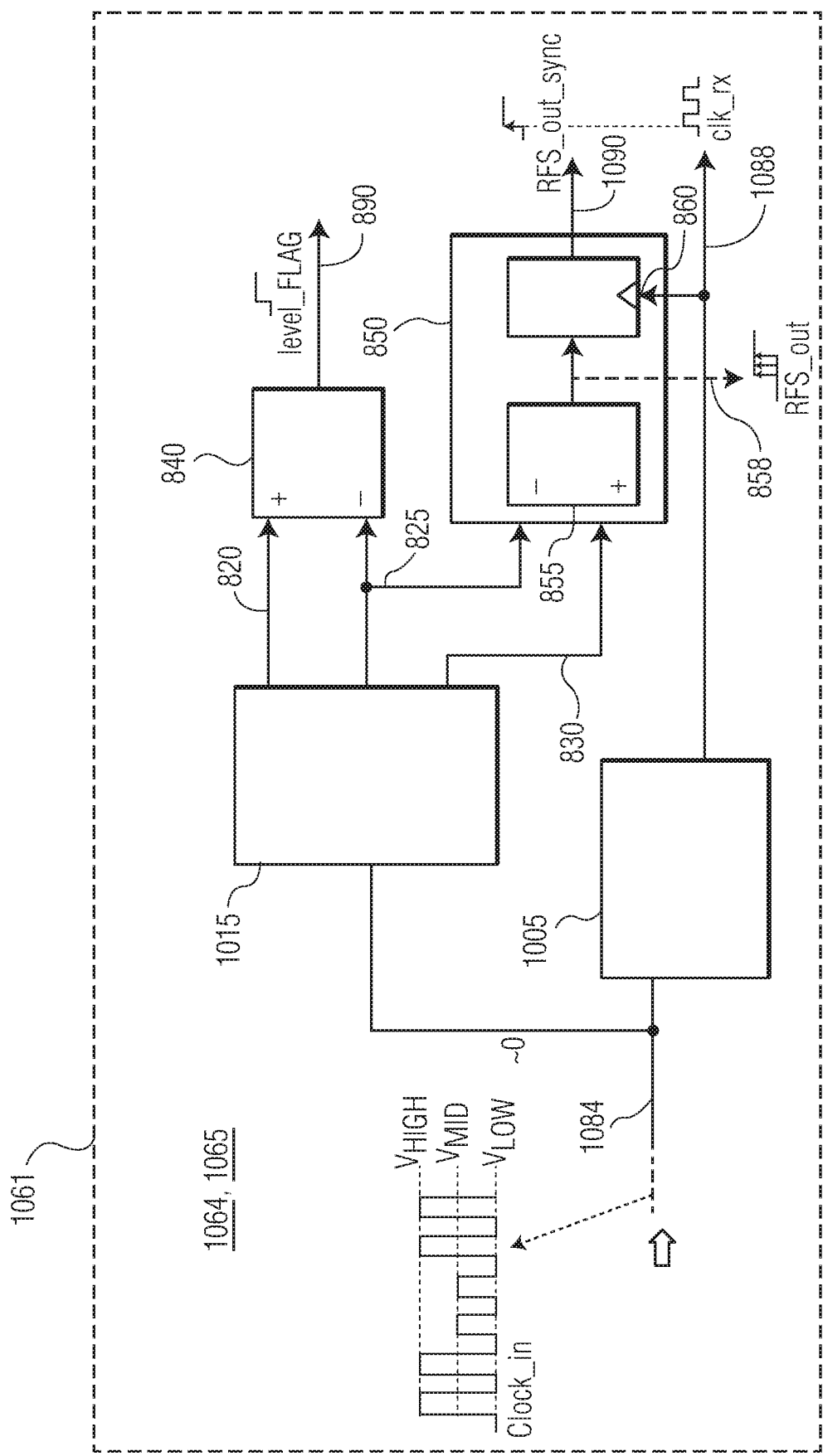
FIG. 10 illustrates a yet further alternative example of a CMOS single-ended receiver Chirp Start demodulator and safety detector circuit, according to example embodiments of the invention.

FIG. 10 illustrates a yet further alternative example of a master-slave clock distribution and synchronization circuit 1061. In this example, the slave-based master-slave clock distribution and synchronization circuit 1061 includes a more detailed example of a RFS demodulator 1064, 1065 that is based on a single-ended CMOS (slave-based or master-based) receiver chirp start demodulator and safety detector circuit, according to some example embodiments of the invention. The slave-based master-slave clock distribution and synchronization circuit 1061 and RFS demodulator 1064, 105 may be included in either or both of a slave device and master device. Clearly, in this example embodiment, the corresponding RFS modulator generates an embedded clock signal having a n RFS signal in a CMOS single-ended form.

In this example, the RFS demodulator 1064, 1065 receives a distributed, modulated CMOS master-slave single ended clock input signal (clock_in) 1084 from a master device. In this CMOS single-ended example, the levels of distributed, modulated CMOS master-slave single ended clock input signal (clock_in) 1084 are not amplitude, but rather logic levels, for example $V_{low}$=logic level-1 (normally zero), $V_{mid}$=logic level-2, $V_{high}$=logic level-3. In some examples, $V_{mid}$ may be is placed in a range (<$V_{dd}$/2) where it can be detected by an edge detector in fast and accurate CMOS single-ended level detector and threshold generator 1015.

In this example, master-slave distribution and synchronization circuit 1061 uses a RFS demodulator 1064, 1065 implemented in, say, a CMOS receive circuit to respectively de-embed (e.g. demodulate) the received distributed, modulated CMOS master-slave single ended clock input signal (clock_in) 1084 into a RFS_out signal 1090 and a master-slave clock signal 1088. In this example, the received distributed, modulated CMOS master-slave clock signal 1084 is input to a CMOS buffer 805. However, in examples of the invention, very low PVT variations are tolerated by careful sizing of the buffer in the CMOS buffer 805, and thereby its associated delay, in order to ensure an output master-slave clock signal 1088 ('clk-rx') with a delay variation lower than ¼ of the clock period (Tclk). Thus, the introduced buffer delay is important since this clock is used later to resample the RFS on all devices.

In this example, the received distributed, modulated CMOS master-slave single ended clock input signal (clock_in) 1084 is also input to a fast and accurate CMOS single-ended level detector and threshold generator 1015. The fast and accurate CMOS single-ended level detector and threshold generator 1015 may be a CMOS logic level detector configured to track a low to high transition of the received distributed, modulated CMOS master-slave single ended clock input signal (clock_in) 1084. In examples of the invention, the fast and accurate CMOS single-ended level detector and threshold generator 1015 needs to be configured to detect a signal rise time of much lower than a signal clock period (Tclk), e.g. (<⅛ of Tclk), over all potential PVT conditions.

In examples of the invention, the fast and accurate CMOS single-ended level detector and threshold generator 1015 generates a 'Vpkhold' signal 825 that is representative of the logic level(s) of a received distributed, modulated CMOS master-slave single ended clock input signal (clock_in) 1084. The 'Vpkhold' signal 825 is provided to both a latched comparator circuit 850 and a safety level comparator circuit 840.

A threshold generator within the fast and accurate CMOS single-ended level detector and threshold generator 1015 is configured to generate a voltage reference 'VthSafe' 820 to be used by the safety level comparator circuit 840. The safety level comparator circuit 840 is configured to track the input signal level of the received distributed, modulated CMOS master-slave clock signal 1084, e.g. by comparing a peak voltage held signal 825 with the safety level voltage 'VthSafe' 820 and register a warning, e.g. a flag 890 or a warning pulse or signal, if the received distributed, modulated CMOS master-slave clock signal 1084 falls below a threshold predefined voltage level at the CMOS RFS demodulator 1064, 1065, thereby ensuring a minimum amplitude is achieved. A minimum amplitude may be needed to ensure that the phase noise and/or jitter specifications may be achieved.

In this example, the latched comparator circuit 850 includes a RFS comparator 855 and a latch circuit 860. In examples of the invention, the threshold generator within the fast and accurate CMOS single-ended level detector and threshold generator 1015 is configured to generate a RFS threshold reference signal 'VthRFS' 830 that is provided to the RFS comparator 855 as well as the 'Vpkhold' signal 825. In this manner, the latched comparator circuit 850 is configured to function as an edge detector by comparing the 'Vpkhold' signal 825 output from the peak detector to the RFS threshold reference signal 'VthRFS' 830, thereby indicating when a low to high transition of the received distributed, modulated CMOS master-slave clock signal 1084 occurs. Thus, the output from the latched comparator circuit 850 is a signal that represents the demodulated RFS ('RFS_out'), accurately latched by latch 860 to the CMOS demodulated clock ('clk_rx') in such a way that variations in the RFS signal and clock signals between master device(s) and slave device(s) are re-synchronized and timing synchronization errors reduced to a minimum.

Figure 11:
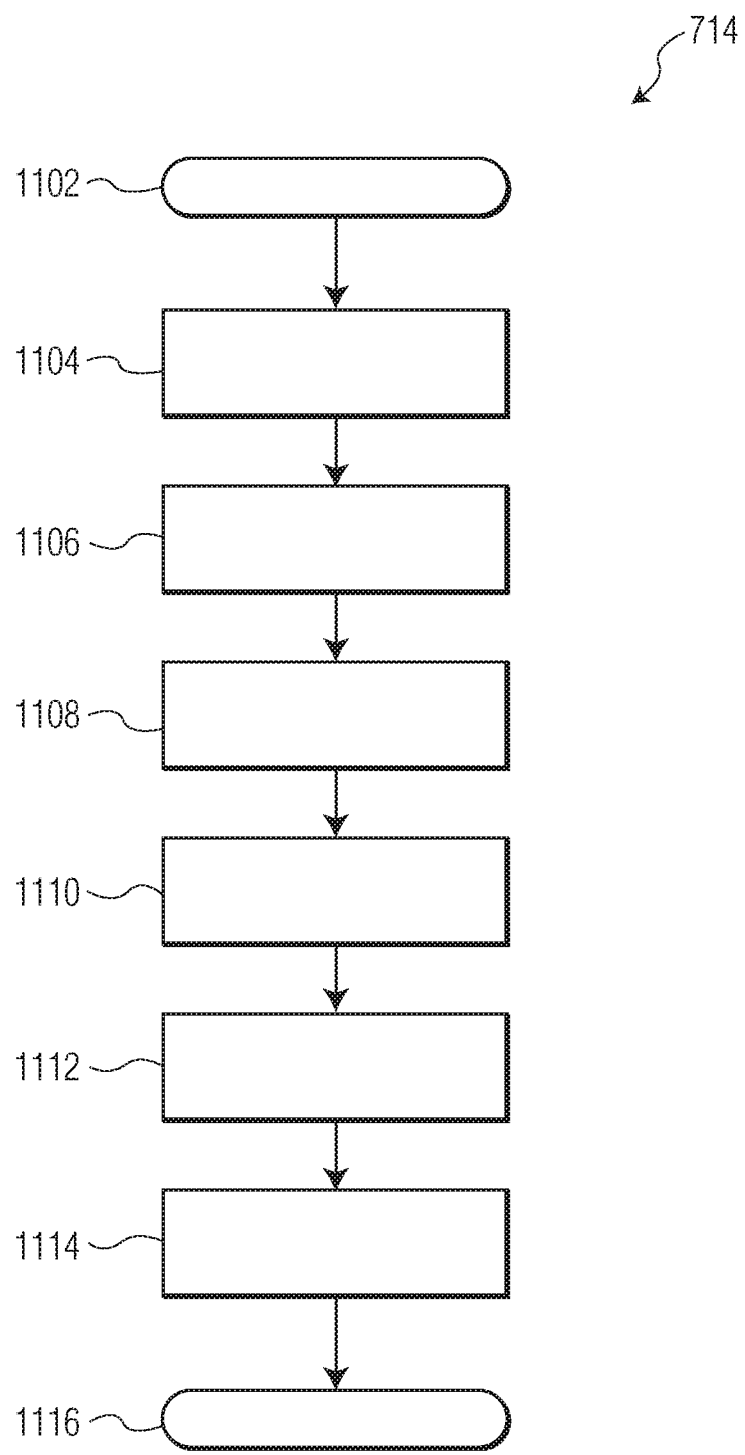
FIG. 11 illustrates an example flowchart of the operation of a LVDS or CMOS differential or CMOS single-ended receiver demodulator, according to example embodiments of the invention.

FIG. 11 illustrates an example flowchart of the operation of a LVDS or CMOS differential or CMOS single ended receiver demodulator, for example operations performed at 714 in FIG. 7, according to example embodiments of the invention. Here, each of the slave device(s) receive a representation of an echo signal and send validated, demodulated data to the MCU based on a demodulated synchronised clock signal with an embedded RFS_in signal. Additionally, if configured accordingly, one or more master device(s) may also be configured to demodulate the synchronised clock signal with an embedded RFS_in signal.

Thus, prior to receiving a synchronised clock signal with an embedded RFS_in signal at a LVDS or CMOS differential or CMOS single ended receiver demodulator, which in the previous example of FIG. 5 is a received distributed, modulated differential or CMOS single-ended master-slave clock signal 584, 1084, a single clock has been used by the master device 510 and distributed throughout the master-slave system. The embedded RFS_in signal, e.g. a chirp start signal, is used to start a modulation function on all devices, and has been embedded in a system clock signal via a RFS modulator 562 of a LVDS or CMOS master-slave distribution and synchronization circuit 560. In some examples, the distributed, modulated differential or CMOS master-slave clock signal 584, 1084 is provided by the master device, and PCB routed in a star connection manner in order to guarantee a same delay of the clock signal across each of the receiving devices.

Thus, at 1102, a distributed, modulated differential or CMOS master-slave clock signal is received at a RFS demodulator (e.g. RFS demodulator 564, 565 of FIG. 5). At 1104, the distributed, modulated differential or CMOS master-slave clock signal is converted to a CMOS dock. At 1106, the CMOS dock (clk_rx 588) is provided to a digital controller (such as digital controller 516, 526). At 1108, an embedded signal (e.g. an RFS synch signal) is detected in (e.g. AM demodulated/de-embedded from) the distributed, modulated differential or CMOS master-slave clock signal. In some examples, this detection may be performed by an edge detector+comparator circuit. At 1110, the demodulated/de-embedded RFS synch signal is re-synchronized using a buffered version of the CMOS clock and a latch mechanism. In some examples, the re-synchronized demodulated/de-embedded RFS synch signal presents very low variations over PVT. In some examples, at 1112, a safety level check flag 890 may be generated if the distributed, modulated differential (e.g. LVDS) or CMOS master-slave clock signal input level is below a certain level (vmin_safety), for example via a safety level comparator 840.

In this manner, synchronization between the master device(s) and slave device(s) is achieved, after which, all the master device(s) and slave device(s) have the same frequency chirp start and chirp end frequencies, as well as the same sampling clock. The data re-sampled by all of the devices (or ICs) including the ADC is now substantially synchronous.

In some examples, the LVDS or CMOS single ended receiver demodulator operations performed at 714 may be supplemented with a programming operation of an AM level at 1114, which is used to set a minimum safety signal level (VthSafe) used for modulating the RFS (Vth_RFS) at the LVDS or CMOS single ended transmitter, with some margin, to avoid safety detector flagging 890 during reception of the RFS signal (e.g. amplitude modulated, and following a $V_{low} \rightarrow V_{high}$ transition). The flowchart then ends at 1116.

Thus, examples of the invention describe a communication unit (such as a radar unit) that includes a plurality of cascaded devices that comprise at least one master device and at least one slave device configured in a master-slave arrangement and configured to process at least one of: transmit signals, and receive signals. The at least one master device includes: a clock generation circuit; a modulator circuit coupled to the clock generation circuit and configured to receive a system dock signal and a frame start signal. The at least one master device is configured to embed the frame start signal (for example a chirp signal) into the system clock signal to produce a modulated embedded master-slave clock signal. The at least one master device transmits the modulated embedded master-slave clock signal to the at least one slave device to synchronise the system clock signal and a frame start signal between the at least one master device and the at least one slave device. In other examples, at least one master device may be employed with any number of slave devices. In this situation, the at least one master device and one or more slave device(s) may present a different number of receiver and transmitters channels. The slave devices can be programmed to have only receive channels on, whilst the transmit channels are enabled by the master device.

Although examples of the invention are described with reference to a radar unit suitable for an automotive application, it is envisaged that the concepts herein described may be applicable to other applications, such as radar for robotics or drones.

In the foregoing specification, the invention has been described with reference to specific examples of embodiments of the invention. It will, however, be evident that various modifications and changes may be made therein without departing from the scope of the invention as set forth in the appended claims and that the claims are not limited to the specific examples described above. The connections as discussed herein may be any type of connection suitable to transfer signals from or to the respective nodes, units or integrated circuit devices. Accordingly, unless implied or stated otherwise, the connections may for example be direct connections or indirect connections. Also, plurality of connections may be replaced with a single connection that transfers multiple signals serially or in a time multiplexed manner. Likewise, single connections carrying multiple signals may be separated out into various different connections carrying subsets of these signals. Therefore, many options exist for transferring signals.

Those skilled in the art will recognize that the architectures depicted herein are merely exemplary, and that in fact many other architectures can be implemented which achieve the same functionality. Any arrangement of components to achieve the same functionality is effectively 'associated' such that the desired functionality is achieved. Hence, any two components herein combined to achieve a particular functionality can be seen as 'associated with' each other such that the desired functionality is achieved, irrespective of architectures or intermediary components. Likewise, any two components so associated can also be viewed as being 'operably connected,' or 'operably coupled,' to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple instances of a particular operation, and the order of operations may be altered in various other embodiments.

In the claims, any reference signs placed between parentheses shall not be construed as limiting the claim. The word 'comprising' does not exclude the presence of other elements or steps then those listed in a claim. Furthermore, the terms 'a' or 'an,' as used herein, are defined as one, or more than one. Also, the use of introductory phrases such as 'at least one' and 'one or more' in the claims should not be construed to imply that the introduction of another claim element by the indefinite articles 'a' or 'an' limits any particular claim containing such introduced claim element to inventions containing only one such element, even when the same claim includes the introductory phrases 'one or more' or 'at least one' and indefinite articles such as 'a' or 'an.' The same holds true for the use of definite articles. Unless stated otherwise, terms such as 'first' and 'second' are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A communication unit comprising:
   a plurality of cascaded devices that comprise at least one master device and at least one slave device configured in a master-slave arrangement and configured to process at least one of: transmit signals, and receive signals;
   wherein the communication unit is characterized in that:
   at least one of the at least one master device and the at least one slave device comprises a RFS demodulator circuit configured to:
   receive a modulated embedded master-slave clock signal that comprises a system clock signal with an embedded frame start signal;
   demodulate the modulated embedded master-slave clock signal; and
   re-create therefrom the system clock signal and the frame start signal.

2. The communication unit of claim 1 wherein at least one of the at least one master device and at least one slave device further comprises:
   a digital controller coupled to the demodulator circuit and configured to re-sample the re-created frame start signal using the re-created system clock signal.

3. The communication unit of claim 2 wherein the digital controller comprises a timing engine coupled to a flip-flop configured to receive and re-sample the re-created frame start signal using the re-created system clock signal in a digital domain.

4. The communication unit of claim 1, wherein the RFS demodulator circuit comprises one of: a CMOS buffer, a low-voltage differential signalling (LVDS) to single ended converter circuit, configured to convert a differential modulated embedded master-slave clock signal to a single ended form.

5. The communication unit of claim 1, wherein the RFS demodulator circuit comprises a detector and threshold generator configured to detect the embedded frame start signal and generate a signal that is representative of a differential input amplitude level of the received modulated differential master-slave clock signal that is distributed.

6. The communication unit of claim 5, wherein the RFS demodulator circuit comprises a latched comparator circuit coupled to the detector and threshold generator configured to receive a signal that is representative of a differential input amplitude level and function as an edge detector.

7. The communication unit of claim 6 wherein the detector and threshold generator is configured to generate a RFS threshold reference signal and the latched comparator circuit is configured to compare the signal that is representative of a differential input amplitude level to the RFS threshold reference signal and identify therefrom an occurrence of a transition between a low voltage and a high voltage of the received distributed, modulated differential master-slave clock signal.

8. The communication unit of claim 7 wherein the latched comparator circuit is configured to generate a latched frame start signal in response to an identified transition between a low voltage and a high voltage of the received distributed, modulated differential master-slave clock signal.

9. The communication unit of claim 6, wherein the detector and threshold generator is configured to detect a signal rise time of the system clock signal within half of a clock period of the system clock signal accommodating any timing delay of signals of the communication unit due to one or more of: process, voltage, temperature, PVT, variations.

10. The communication unit of claim 5, wherein the RFS demodulator circuit comprises a safety level comparator circuit coupled to the detector and threshold generator and the detector and threshold generator is also configured to generate a safety level voltage reference and provide the safety level voltage reference and the signal that is representative of a differential input amplitude level to the safety level comparator circuit, wherein the safety level comparator circuit is configured to generate a warning signal if the received distributed, modulated differential master-slave clock signal falls below a threshold predefined voltage level.

11. The communication unit of claim 5, wherein the detector and threshold generator is configured to detect at least one of: a signal peak of the received distributed, modulated differential master-slave clock signal, a clock edge of the received distributed, modulated differential master-slave clock signal.

12. The communication unit of claim 1, wherein the RFS demodulator circuit comprises a CMOS buffer circuit configured to convert a multiple level CMOS single-ended modulated embedded master-slave clock signal to a single-ended two-level master-slave clock signal.

13. The communication unit of claim 1, wherein the demodulator circuit is configured to re-create the system clock signal with a delay variation of less than a ¼ of a clock period over at least one of process, voltage or temperature, PVT, variations compared to a clock cycle of the system clock signal.

14. An integrated circuit for a device in a master-slave arrangement, wherein the integrated circuit is characterized by a demodulator circuit configured to:

receive a modulated embedded master-slave clock signal that comprises a system clock signal with an embedded frame start signal;

demodulate the modulated embedded master-slave clock signal; and re-create therefrom the system clock signal and the frame start signal.

15. A method for clock distribution and synchronization in a communication unit having at least one master device and at least one slave device configured in a master-slave arrangement and configured to process at least one of: transmit signals, and receive signals, wherein the method comprises, at a master device:

receiving a modulated embedded master-slave clock signal that comprises a system clock signal with an embedded frame start signal;

demodulating the modulated embedded master-slave clock signal; and re-creating therefrom the system clock signal and the frame start signal.

* * * * *